US012005898B2

United States Patent
Sakayori et al.

(10) Patent No.: US 12,005,898 B2
(45) Date of Patent: Jun. 11, 2024

(54) MOBILE OBJECT PLATOON CONTROL SYSTEM THAT CALCULATES LONGITUDINAL ACCELERATION OF THE MOBILE OBJECTS BY SETTING A GAIN OF AN ARITHMETIC EXPRESSION

(71) Applicant: Hitachi, Ltd., Tokyo (JP)

(72) Inventors: Go Sakayori, Tokyo (JP); Junya Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 23 days.

(21) Appl. No.: 17/640,888

(22) PCT Filed: Jan. 22, 2021

(86) PCT No.: PCT/JP2021/002149
§ 371 (c)(1),
(2) Date: Mar. 7, 2022

(87) PCT Pub. No.: WO2021/199608
PCT Pub. Date: Oct. 7, 2021

(65) Prior Publication Data
US 2022/0332318 A1 Oct. 20, 2022

(30) Foreign Application Priority Data
Mar. 31, 2020 (JP) ................................ 2020-062509

(51) Int. Cl.
*B60W 30/16* (2020.01)
*G08G 1/00* (2006.01)

(52) U.S. Cl.
CPC ......... *B60W 30/16* (2013.01); *B60W 2520/06* (2013.01); *B60W 2540/225* (2020.02);
(Continued)

(58) Field of Classification Search
CPC ......... B60W 30/16; B60W 2554/4041; B60W 2540/225; B60W 2520/06; B60W 2720/106; G08G 1/22
See application file for complete search history.

(56) References Cited

U.S. PATENT DOCUMENTS

2013/0131947 A1   5/2013  Takahashi et al.
2015/0321669 A1*  11/2015 Inou ...................... B60W 30/14
                                                701/70
(Continued)

FOREIGN PATENT DOCUMENTS

CN   110539799 A  * 12/2019  ........... B62D 15/029
JP   2008-110620 A    5/2008
(Continued)

OTHER PUBLICATIONS

CN-110539799-A—Machine Translation, Chang Y et al. (Year: 2019).*
(Continued)

Primary Examiner — Jess Whittington
Assistant Examiner — Rami Nabih Bedewi
(74) Attorney, Agent, or Firm — MATTINGLY & MALUR, PC

(57) ABSTRACT

Provided is a mobile body control system capable of improving both the comfort of passengers in each mobile body and the efficiency of cargo transport when a plurality of mobile bodies travel in a formation. A mobile body control system (1) causes a plurality of mobile bodies (21) to travel in a formation along a preset travel route, and comprises a preceding/succeeding acceleration calculation unit (S49) that calculates a preceding/succeeding acceleration of a preceding mobile body (21_n) and a succeeding mobile body (21_n+1) on the travel route. The preceding/succeeding acceleration calculation unit adjusts a gain E of an arithmetic expression used to calculate the preceding/
(Continued)

succeeding acceleration on the basis of information about a transported object being transported by each mobile body (21).

9 Claims, 27 Drawing Sheets

(52) U.S. Cl.
CPC ............... *B60W 2554/4041* (2020.02); *B60W 2720/106* (2013.01); *G08G 1/22* (2013.01)

(56) References Cited

U.S. PATENT DOCUMENTS

| | | | |
|---|---|---|---|
| 2017/0369062 A1 | 12/2017 | Saigusa et al. | |
| 2019/0225232 A1* | 7/2019 | Blau | G05D 1/0088 |
| 2019/0286163 A1 | 9/2019 | Yasuda et al. | |
| 2021/0339770 A1* | 11/2021 | Tamori | B60W 60/0015 |

FOREIGN PATENT DOCUMENTS

| | | | | |
|---|---|---|---|---|
| JP | 2008-204094 A | 9/2008 | | |
| JP | 2009-262701 A | 11/2009 | | |
| JP | 2012-030674 A | 2/2012 | | |
| JP | 2015-214288 A | 12/2015 | | |
| JP | 2019-159829 A | 9/2019 | | |
| WO | 2015/047177 A1 | 4/2015 | | |
| WO | WO2019130483 A1 * | 12/2017 | ............ | B60W 40/08 |
| WO | WO-2019130483 A1 * | 7/2019 | ............ | B60W 40/08 |

OTHER PUBLICATIONS

WO-2019130483-A1—Machine Translation, Hiroshi M et al. (Year: 2019).*
Machine Translation—WO2019130483A1—Hiroshi et al.—2017 (Year: 2017).*
Makoto Yamakado, et al, "Improvement in vehicle agility and stability by G-Vectoring Control", Vehicle System Dynamics, Vo. 48, Supplement, 2010 pp. 231-254.
J. Takahashi, et al, "Evaluation of Preview G-Vectoring Control To Decelerate a Vehicle Prior To Entry Into a Curve", International Journal of Automotive Technology, vol. 14, No. 6, pp. 921-926 (2013).
International Search Report of PCT/JP2021/002149 dated Apr. 13, 2021.
Extended European Search Report received in corresponding European Application No. 21782308.7 dated Mar. 12, 2024.

* cited by examiner

FIG. 2
(a)
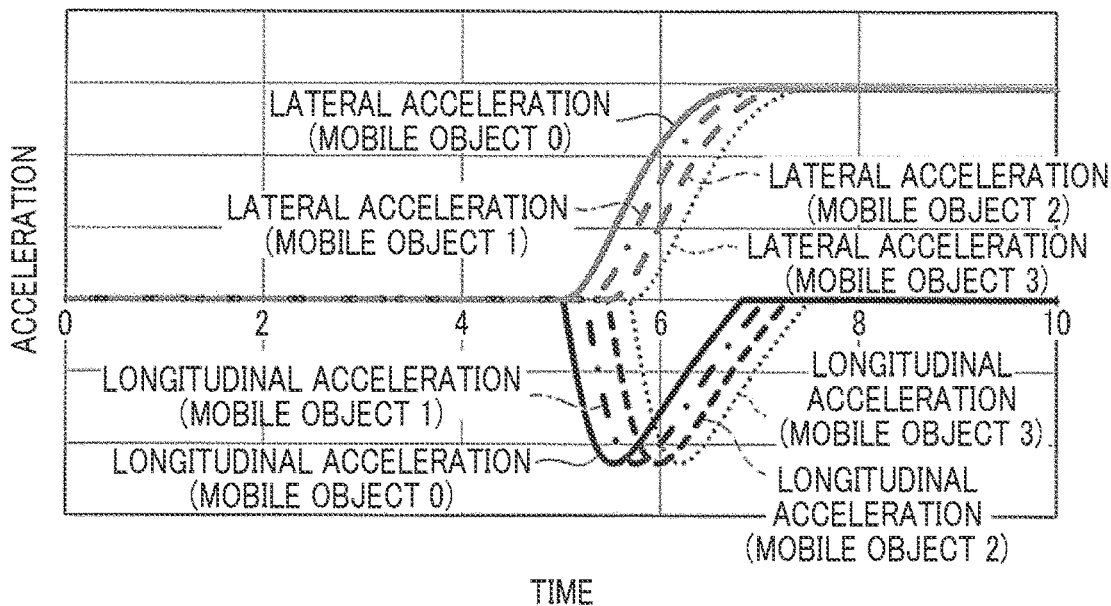
(b)
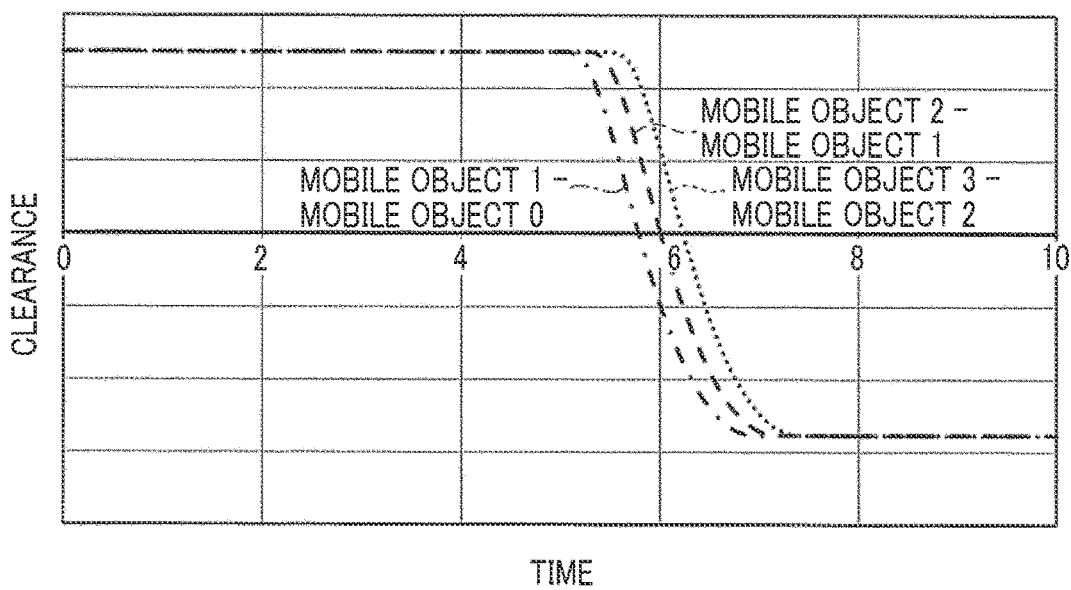

FIG. 4
(a)
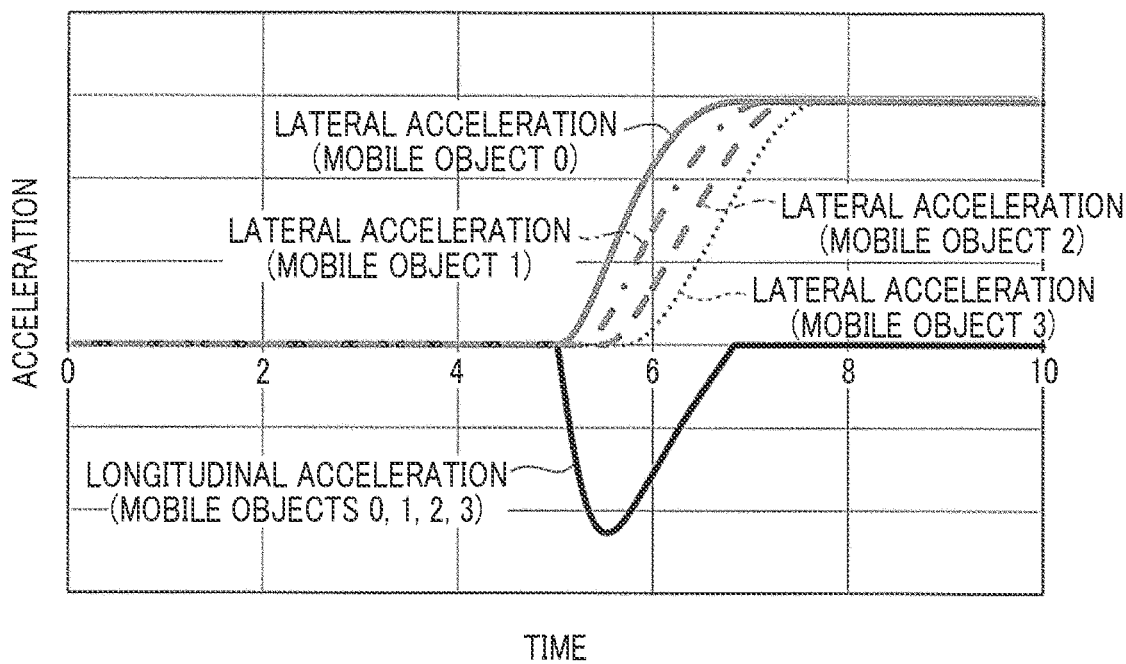
(b)
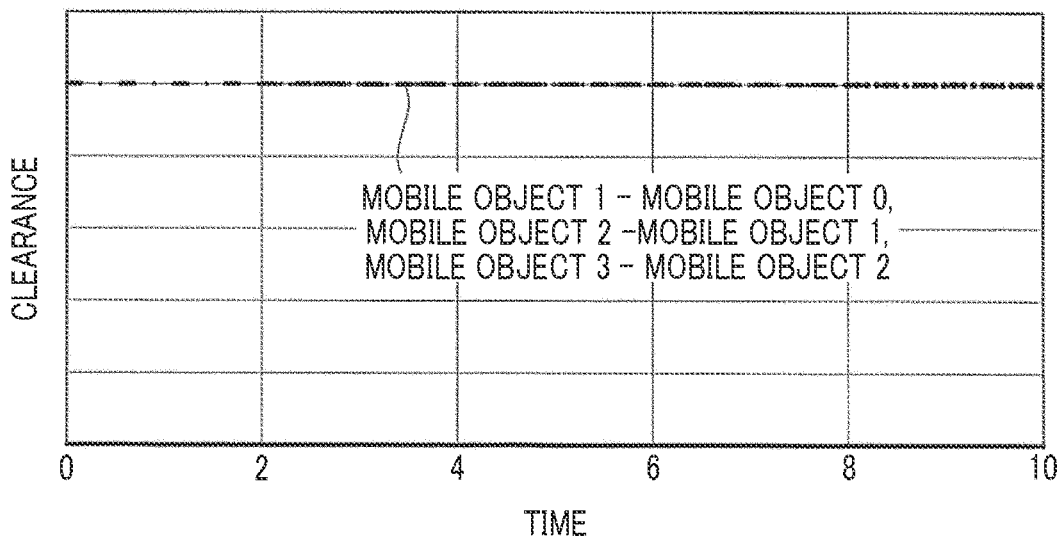

"g-g" DIAGRAM

FIG. 7
(a)
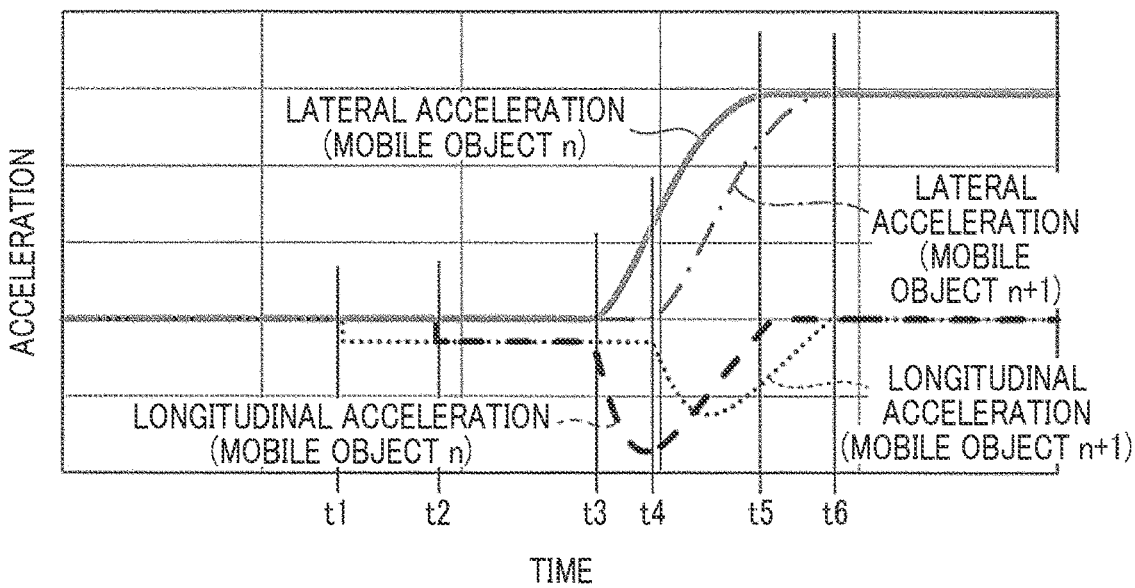
(b)
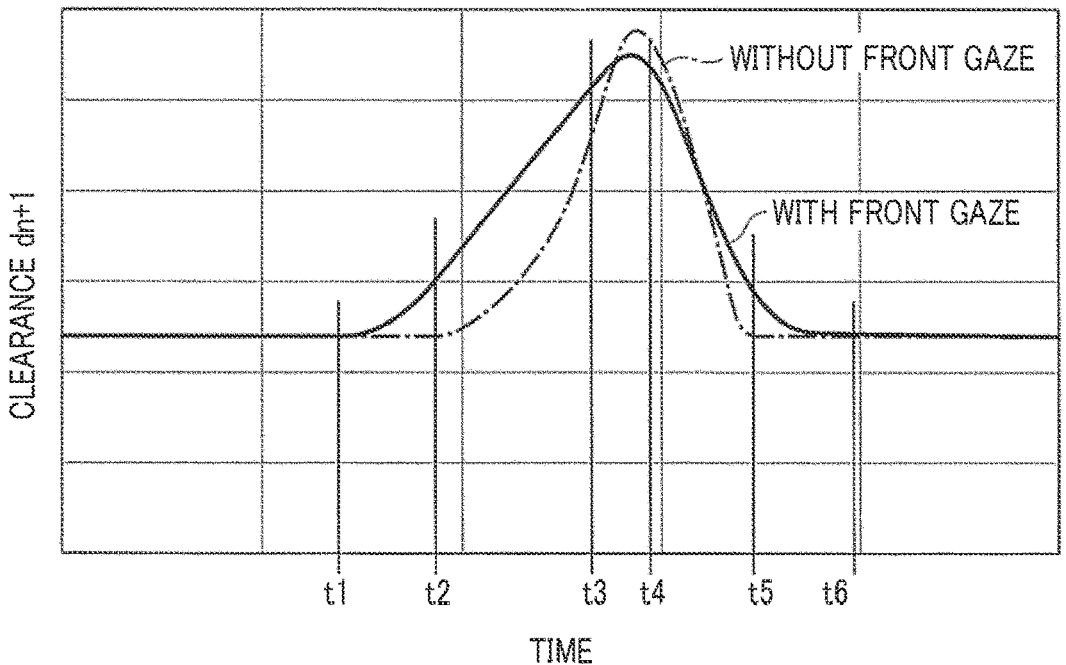

FIG. 8
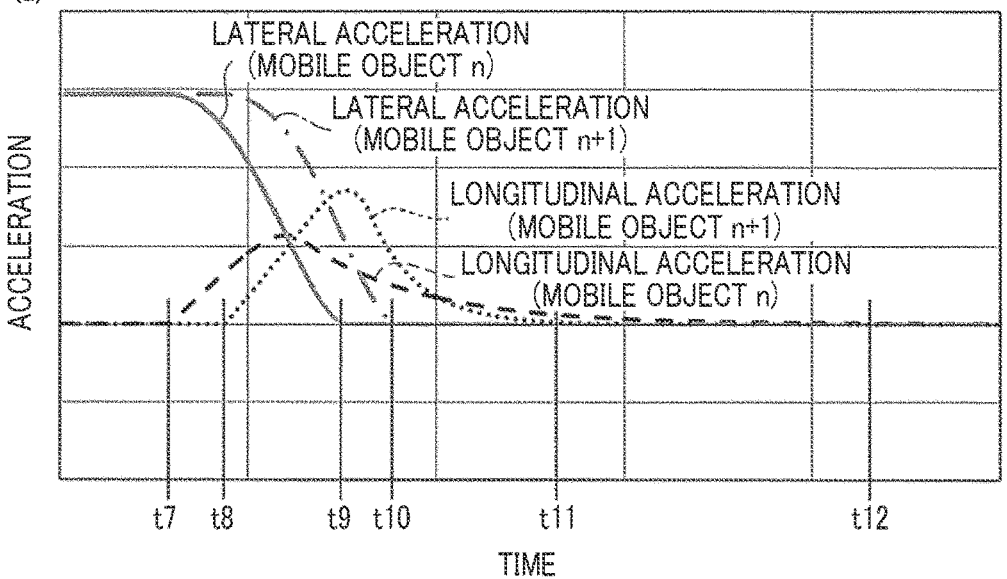
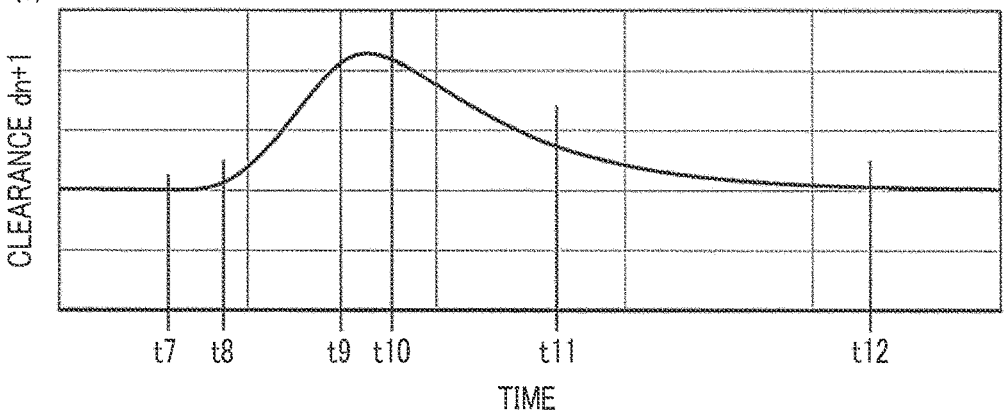
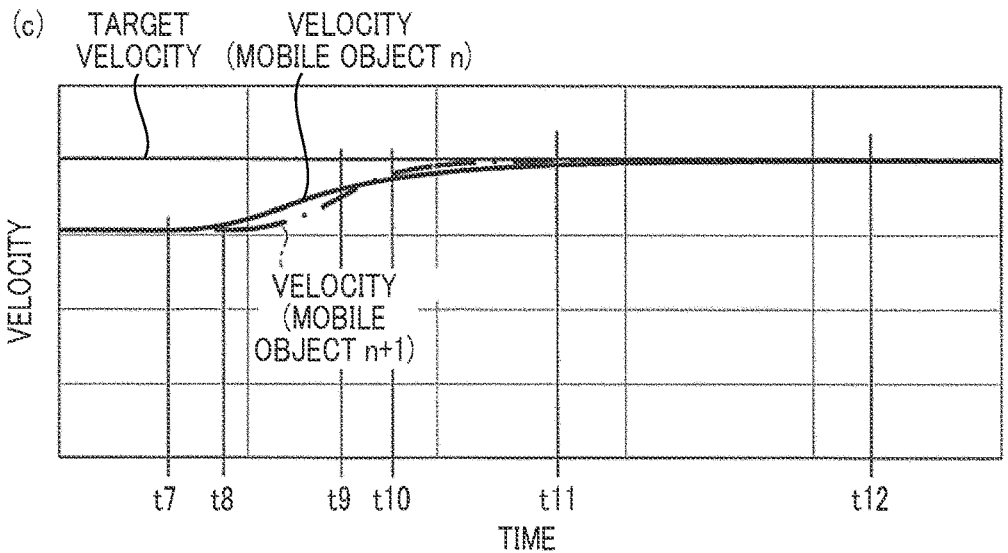

FIG. 10
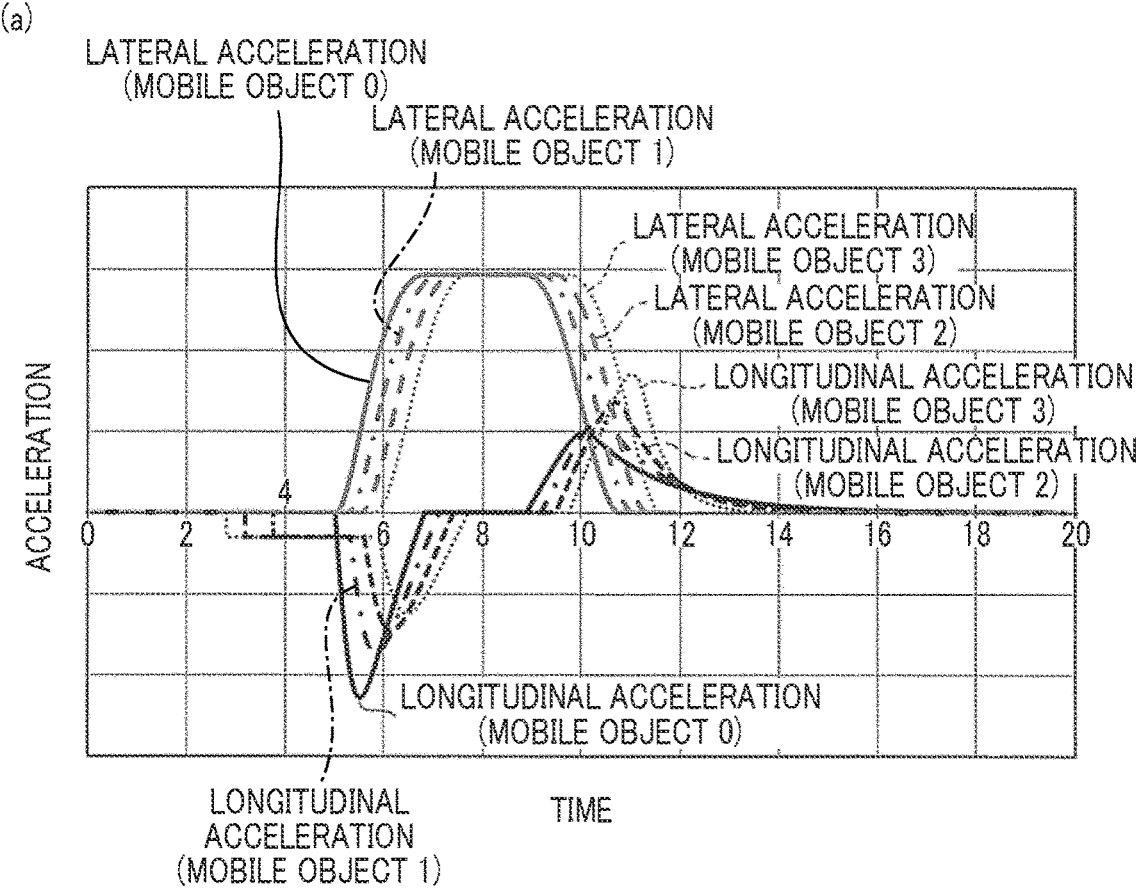
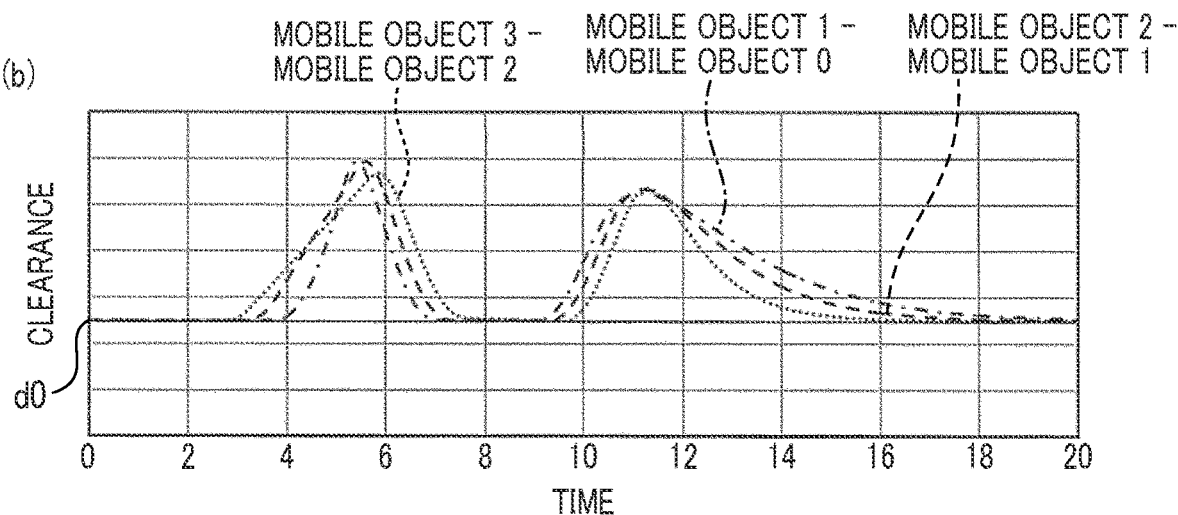

FIG. 18
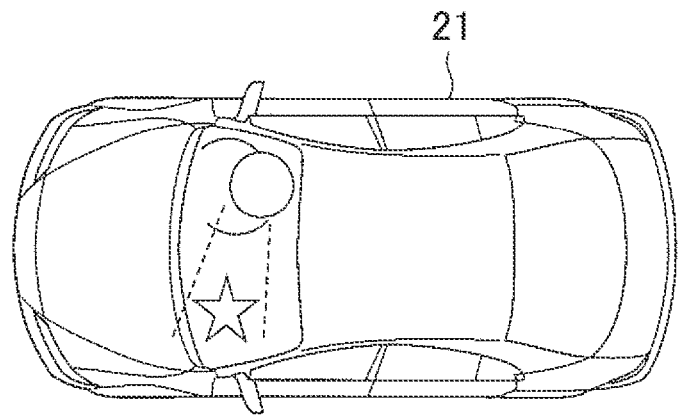
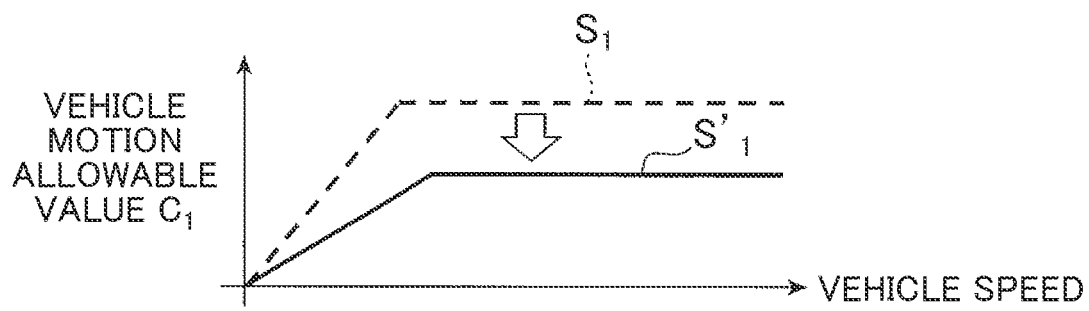
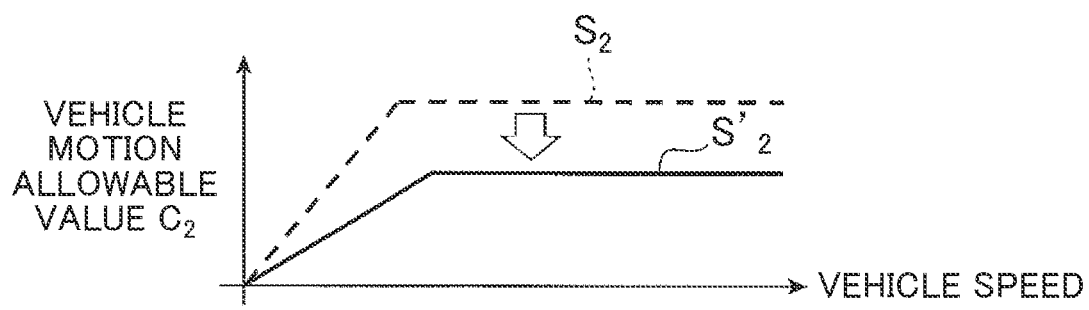
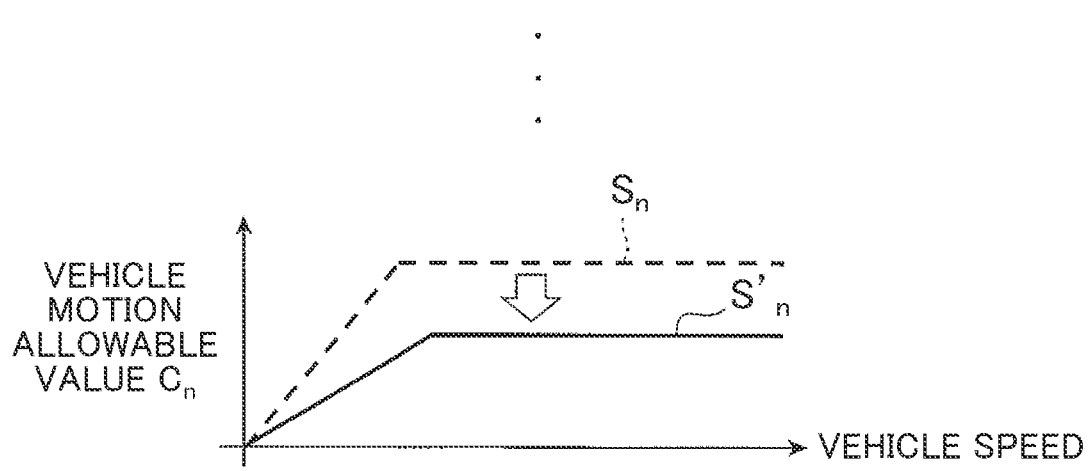

FIG. 19
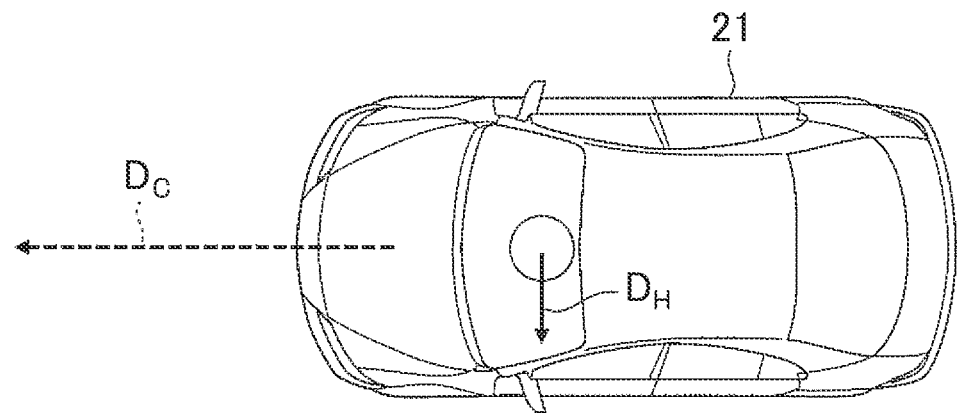
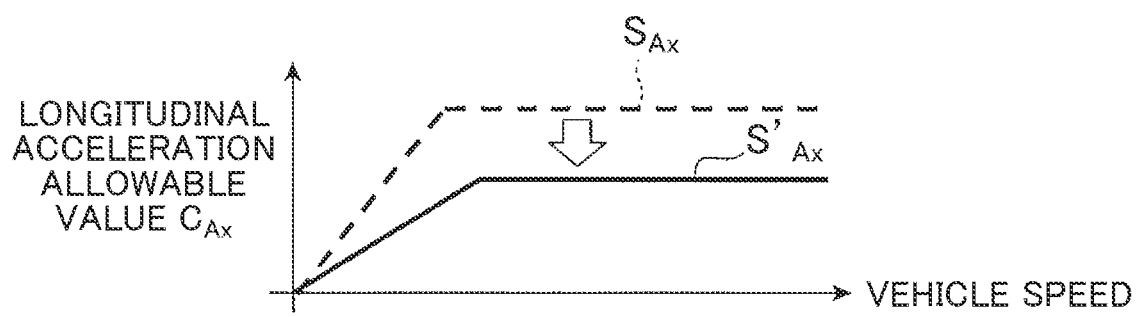
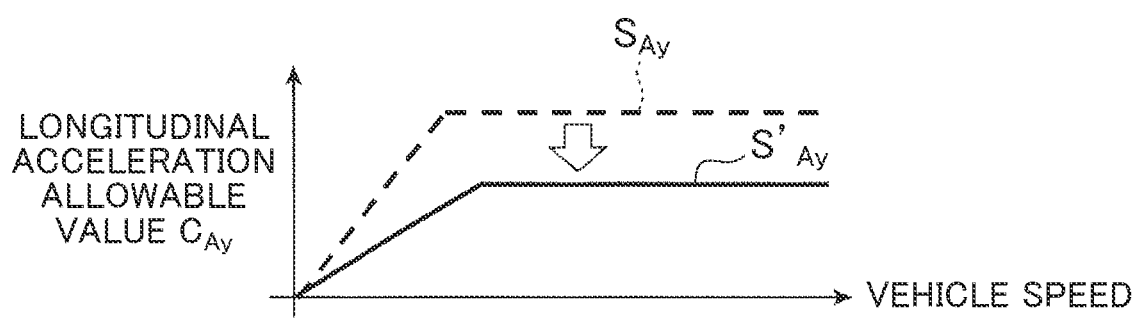

MOBILE OBJECT PLATOON CONTROL SYSTEM THAT CALCULATES LONGITUDINAL ACCELERATION OF THE MOBILE OBJECTS BY SETTING A GAIN OF AN ARITHMETIC EXPRESSION

TECHNICAL FIELD

The present invention relates to a mobile object control system.

BACKGROUND ART

In recent years, development of ADAS (Advanced Driver Assist System) in a vehicle and autonomous driving related techniques is being advanced rapidly. As functions of automating a part of driving operation, adaptive cruise control, lane keep assist system, autonomous emergency braking, and the like are in practical use. However, each of those functions is a system of automatically controlling only one of a longitudinal motion and a lateral motion of a vehicle. To realize a smooth vehicle motion in a travel scene of a turn with acceleration/deceleration, for example, a curved road having sharp curvature on which lateral acceleration becomes excessive when a vehicle travels at a constant speed, overtaking, merging, or the like, a control in which a longitudinal motion and a lateral motion of a vehicle are coordinated is necessary.

With respect to coordination of a longitudinal motion and a lateral motion generated in a vehicle, Patent Literature 1 discloses a vehicle motion control method in which an input lateral jerk (Gy_dot) of a vehicle is multiplied by a pre-stored gain (Cxy) which is determined from a velocity (V) and a lateral acceleration (Gy), a control command for controlling a longitudinal acceleration of a vehicle is generated based on a value obtained by the multiplication, and the control command generated is output. According to the method, the locus of a synthetic acceleration vector (G) of the longitudinal acceleration and the lateral acceleration is subjected to vectoring so as to draw a smooth curve in a coordinate system in which the gravity center of the vehicle is fixed, and it is called G-vectoring control (GVC). It is reported that emergency avoidance performance is significantly improved by the GVC (refer to Nonpatent Literature 1).

For example, Patent Literature 2 discloses a method of performing acceleration/deceleration on the basis of a time change in curvature of a curve in a travel course in front of an own vehicle. According to the method, continuous deceleration can be realized for a period of time before a lateral acceleration is generated in the own vehicle until a turn transition period in which the absolute value of the lateral acceleration increases. The technique is called preview G-vectoring control (PGVC) since forward gaze information is added to the above-described G-vectoring control (refer to Nonpatent Literature 2).

In addition, in recent years, for traffic jam reduction and transport efficiency improvement in road transport, an automatic tracking travel (also called platoon travel) system with an extremely small clearance is being developed.

Although Patent Literatures 1 and 2 disclose the methods of making a single vehicle smoothly travel by coordinating a longitudinal motion and a lateral motion at the time of a travel on a curved road as described above, both of Patent Literatures 1 and 2 do not refer to an acceleration/deceleration method in the case where a plurality of vehicles travel in a platoon.

On the other hand, with respect to a method of performing a platoon travel while transmitting/receiving information of acceleration/deceleration among a plurality of vehicles, for example, Patent Literature 3 discloses a method of generating a platoon travel velocity pattern on the basis of a target velocity pattern of an own vehicle and a target velocity pattern of another vehicle as needed and performing a vehicle travel control in accordance with the platoon travel velocity pattern. For example, Patent Literature 4 discloses a method of sharing a travel plan which is preliminarily set in vehicles in a platoon and changing the order of the vehicle platoon in order from the vehicle whose deceleration control start timing is the slowest.

CITATION LIST

Patent Literature

Patent literature 1: Japanese Unexamined Patent Application Publication No. 2009-262701
Patent literature 2: Japanese Unexamined Patent Application Publication No. 2012-030674
Patent literature 3: Japanese Unexamined Patent Application Publication No. 2008-110620
Patent literature 4: Japanese Unexamined Patent Application Publication No. 2008-204094

Nonpatent Literature

Nonpatent Literature 1: M. Yamakado, J. Takahashi, S. Saito, A. Yokoyama, and M. Abe, Improvement in vehicle agility and stability by G-Vectoring control, Veh. Syst. Dyn. 48(2010), pp. 231-254
Nonpatent Literature 2: Takahashi, J., et al., "Evaluation of Preview G-Vectoring Control to decelerate a vehicle prior to entry into a curve", International Journal of Automotive Technology, Vol. 14, No. 6, 2013, pp. 921-926.

SUMMARY OF INVENTION

Technical Problem

However, in the control of acceleration/deceleration in Patent Literatures 3 and 4, a longitudinal motion coordinated with a lateral motion described in Patent Literatures 1 and 2 is not considered, and a method of realizing a smooth motion at the time of acceleration/deceleration accompanying a lateral motion in all of vehicles travelling in a platoon is not apparent. For example, in a deceleration control at a timing of a preceding vehicle at the time of travel on a curved road during platoon travel, there is the possibility that the ride comfort of an occupant deteriorates in each of vehicles (particularly, toward the vehicle at the tail end).

In the case where a platoon is organized by a plurality of mobile objects and the plurality of mobile objects include an empty vehicle on which no occupant rides and a carrier which travels while carrying cargo, a motion which places priority on transport efficiency such as travel velocity of the platoon and the number of mobile objects over ride comfort of an occupant has to be performed.

The present invention has been achieved in consideration of the above-described circumstances and an object of the invention is to provide a mobile object control system capable of improving both comfortability of an occupant riding on a mobile object and transport efficiency of cargo at the time of platoon travel by a plurality of mobile objects.

Solution to Problem

To achieve the object, a mobile object control system according to the present invention is a mobile object control system for making a plurality of mobile objects travel in a platoon along a travel path which is preliminarily set. The system includes a longitudinal acceleration computing unit computing a longitudinal acceleration in a travel path of a preceding mobile object and a following mobile object, and is characterized in that the longitudinal acceleration computing unit adjusts a gain of an arithmetic expression for computing the longitudinal acceleration on the basis of information of a carriage object which is carried by each of the mobile objects.

Advantageous Effects of Invention

According to the present invention, for example, the relation between a longitudinal acceleration and a lateral acceleration generated until a group of mobile objects which have travelled in a platoon in a straight line section enters a steady turn state can be controlled so as to be suitably changed for all of the mobile objects in the platoon. The effect of improving comfortability of an occupant in each of the mobile objects and transport efficiency of cargo can be expected.

Further characteristics related to the present invention will become apparent from the description of the specification and appended drawings. The other objects, configurations, and effects of the present invention will become apparent by the following description of embodiments.

BRIEF DESCRIPTION OF DRAWINGS

FIGS. 2(a) and 2(b) illustrate travel states at the time of traveling on a curved road when longitudinal acceleration control for platoon travel is performed in a reference method 1; FIG. 2(a) is a diagram illustrating lateral acceleration and longitudinal acceleration of each of mobile objects, and FIG. 2(b) is a diagram illustrating clearances.

FIGS. 4(a) and 4(b) illustrate travel states at the time of traveling on a curved road when longitudinal acceleration control is performed for platoon travel in a reference method 2; FIG. 4(a) is a diagram illustrating lateral acceleration and longitudinal acceleration of each of mobile objects, and FIG. 4(b) is a diagram illustrating clearances.

FIGS. 7(a) and 7(b) illustrate a travel state at the time of travelling on a curved road when negative longitudinal acceleration control for platoon travel is performed in the present invention; FIG. 7(a) is a diagram illustrating lateral acceleration and longitudinal acceleration of each of the mobile objects, and FIG. 7(b) is a diagram illustrating clearances.

FIGS. 8(a) and 8(b) illustrate a travel state at the time of travelling on a curved road when positive longitudinal acceleration control for platoon travel is performed in the present invention; FIG. 8(a) is a diagram illustrating lateral acceleration and longitudinal acceleration of each of the mobile objects, FIG. 8(b) is a diagram illustrating clearances, and FIG. 8(c) is a diagram illustrating velocities of the mobile objects.

FIGS. 10(a) and 10(b) illustrate a travel state at the time of travelling on a curved road when the longitudinal acceleration control to platoon travel is performed in the present invention, FIG. 10(a) is a diagram illustrating lateral acceleration and longitudinal acceleration of each of the mobile objects, and FIG. 10(b) is a diagram illustrating clearances.

FIG. 18 is a diagram provided as an operation example of the case where an object to be visually recognized of an occupant exists in the mobile object.

FIG. 19 is a diagram provided as an operation example in the case where a mobile object travel direction and an occupant direction are different.

FIG. 24(a) is a diagram illustrating changes in the longitudinal acceleration and the lateral acceleration of a single mobile object, FIG. 24(b) is a diagram illustrating changes in the longitudinal acceleration of a preceding mobile object and a following mobile object in the case where no occupant rides on the following mobile object, FIG. 24(c) is a diagram illustrating changes in the longitudinal acceleration of the preceding mobile object and the following mobile object in the case where the occupant of the following mobile object sees forward, and FIG. 24(d) is a diagram illustrating changes in the longitudinal acceleration of the preceding mobile object and the following mobile object in the case where the occupant of the preceding mobile object sees rearward.

FIG. 25(a) is a "g-g" diagram in the case where no occupant rides in the following mobile object, FIG. 25(b) is a "g-g" diagram in the case where the occupant of the following mobile object sees forward, and FIG. 25(c) is a "g-g" diagram in the case where the occupant of the preceding mobile object sees rearward.

DESCRIPTION OF EMBODIMENTS

Figure 1:
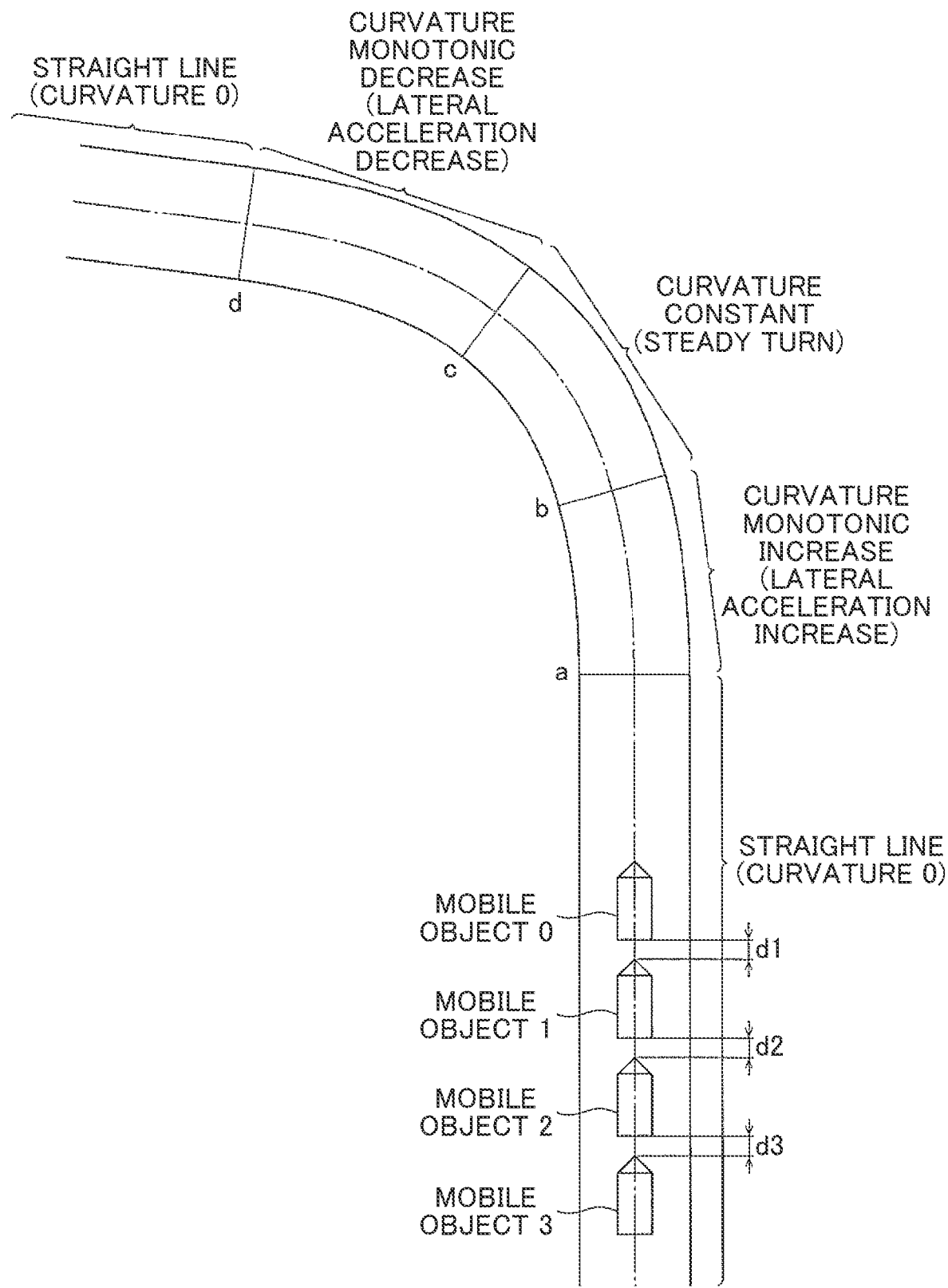
FIG. 1 is a diagram illustrating a part of the shape of a road including a curve section.

Hereinafter, embodiments of the present invention will be described with reference to the drawings.

Description of Outline of Embodiments

Prior to description of concrete embodiments, to facilitate understanding of the present invention, first, referring to FIGS. 1 to 11, an acceleration control method when a platoon travel mobile object group of four mobile objects (mobile object 0, mobile object 1, mobile object 2, and mobile object 3) enters a curve from a straight road and comes into a steady turn state while comparing the differences among reference method 1, reference method 2, and the method of the present invention. In the embodiment, when the gravity point of a mobile object is set as the origin, the longitudinal direction of the mobile object is set as x, and the direction orthogonal to the longitudinal direction (the lateral (right-left) direction of the mobile object) is set as y, acceleration in the x direction is longitudinal acceleration, and acceleration in the y direction is lateral acceleration. When a mobile object forward direction is positive, that is, when a mobile object travels forward, the longitudinal acceleration which increases the velocity of the mobile object is set as positive. When a mobile object travels forward, lateral acceleration generated at the time of a turn to the left (counterclockwise turn) is set as positive, and the opposite direction is set as negative. The turning radius to the left is set as positive, and its reciprocal is set as mobile object travel curvature. Similarly, also with respect to a target path (travel path), the turning radius to the left is set as positive, and its reciprocal is set as target path curvature (curvature of travel path). The steering angle in the direction of turn to the left (counterclockwise turn) is set as positive.

In the reference method 1, each of mobile objects in a platoon performs the G-Vectoring control independently as a longitudinal acceleration control for a curved road and as a longitudinal acceleration control coordinated with a lateral motion from the start of a turn to a steady turn. As the reference method 2, by sharing a velocity profile in the platoon and performing the same longitudinal acceleration control at the same timing in all of mobile objects in the platoon, the mobile objects travel without changing the clearance between front and rear mobile objects. In the reference method 2, as the longitudinal acceleration control for a curved road, the G-Vectoring control is performed in a manner similar to the reference method 1.

FIG. 1 is a diagram illustrating a part of the shape of a road including a curve section and, for description of velocity control of the embodiment, is a conceptual diagram of a curved road (road having a curve section) having a straight line section (curvature 0), a curvature monotonic change section (lateral acceleration change) as a relaxation curve section, and a curvature constant section (steady turn), and a plurality of mobile objects (mobile objects 0, 1, 2, and 3) travelling (platoon traveling) on the road. It is assumed that the travel path of the mobile objects is a curved road in which lateral acceleration occurs. The mobile objects form a platoon in the longitudinal direction (travel direction), travel (platoon travel) so as to follow each target path (travel path) according to a course shape (road shape) and maintain predetermined clearances (d1: mobile object 1–mobile object 0, d2: mobile object 2–mobile object 1, and d3: mobile object 3–mobile object 2, for example, d1≈d2≈d3) and, sequentially, enter/exit the curve.

FIGS. 2(a) and 2(b) illustrate travel states at the time of traveling on a curved road when longitudinal acceleration control for platoon travel is performed in the reference method 1. FIG. 2(a) is a diagram illustrating lateral acceleration and longitudinal acceleration of each of mobile objects, and FIG. 2(b) is a diagram illustrating clearances. More specifically, FIGS. 2(a) and 2(b) illustrate longitudinal acceleration and lateral acceleration in each of the mobile objects and clearances between the mobile objects (mobile object 1–mobile object 0, mobile object 2–mobile object 1, and mobile object 3–mobile object 2) at the time of performing the reference method 1, that is, the G-Vectoring control uniquely in each mobile object when the mobile objects 0, 1, 2, and 3 travel on a curved road as illustrated in FIG. 1.

In this case, as illustrated in FIG. 2(a), it is understood that, in each of the mobile objects 0, 1, 2, and 3, in the section in which the curvature of the travel path (≈ road curvature) increases and (the absolute value of) the lateral acceleration increases, the longitudinal acceleration control coordinated with the lateral motion (G-vectoring control) is performed. At this time, since negative longitudinal acceleration control is performed in order from the mobile object 0 as the head mobile object, as illustrated in FIG. 2(b), the clearance between the mobile objects decreases in order.

Figure 3:
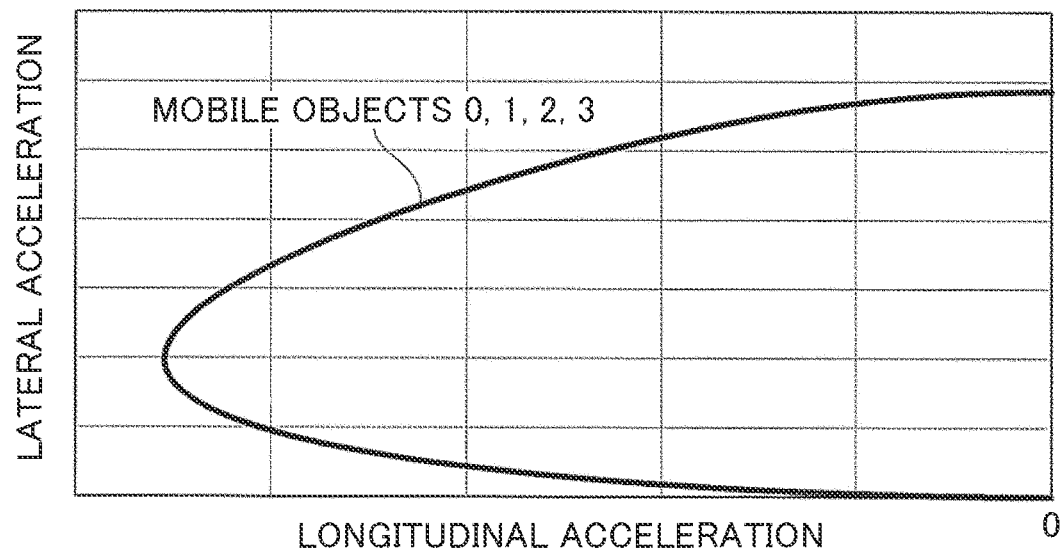
FIG. 3 is a diagram illustrating the relation between lateral acceleration and longitudinal acceleration of each of mobile objects at the time of traveling on a curved road when the longitudinal acceleration control for the platoon travel is performed in the reference method 1.

FIG. 3 is a "g-g" diagram illustrating the relation between longitudinal acceleration and lateral acceleration at this time. FIG. 3 is a diagram illustrating the relation between the lateral acceleration and the longitudinal acceleration in each of the mobile objects at the time of traveling on the curved road when the longitudinal acceleration control for the platoon travel is performed by the reference method 1.

From the relation between them, it is understood that the same change occurs in all of the mobile objects and the motion of smoothly changing from the longitudinal acceleration to the lateral acceleration is realized in all of the mobile objects. Consequently, there is no sudden motion in the mobile objects and, for example, in the case where an occupant rides in the mobile object, the ride comfort is excellent and, in the case where cargo is loaded in the mobile object, a cargo shifting is prevented.

However, as illustrated in FIG. 2(b), in the configuration that each of the mobile objects performs the G-vectoring control uniquely, the clearance decreases at the time of entry of the curve, so that the risk of collision between the mobile objects in the platoon travel increases and, in order to avoid the collision, the clearances at the time of platoon travel have to be large. In this case, the effect of improvement in transport density by the platoon travel decreases and it becomes like a scene that each of the mobile objects travels singularly. When the clearance decreases rapidly at the time of entry of a curve, for example, in the case where an occupant rides in a following mobile object and the sight line of the occupant is forward, the occupant sees as if the preceding mobile object approaches, and may feel anxiety or oppression of a collision.

FIGS. 4(a) and 4(b) illustrate travel states at the time of traveling on the curved road when longitudinal acceleration control for platoon travel is performed by the reference method 2. FIG. 4(a) is a diagram illustrating lateral acceleration and longitudinal acceleration of each of the mobile objects, and FIG. 4(b) is a diagram illustrating clearances. More specifically, FIGS. 4(a) and 4(b) illustrate the longitudinal acceleration and the lateral acceleration of each of the mobile objects and clearances between the mobile objects (mobile object 1–mobile object 0, mobile object 2–mobile object 1, and mobile object 3–mobile object 2) at the time of the reference method 2, that is, at the time that the mobile objects in the platoon perform the longitudinal acceleration control in the same velocity profile when the mobile objects 0, 1, 2, and 3 travel on the curved road as illustrated in FIG. 1.

In this case, as illustrated in FIG. 4(a), it is understood that, in all of the mobile objects 0, 1, 2, and 3, the longitudinal acceleration control is performed, which is the same as the G-Vectoring control that starts at the timing when the curvature of the travel path (≈ road curvature) of the mobile object 0 increases and (the absolute value of) the lateral acceleration of the mobile object 0 increases. At this time, since the same negative longitudinal acceleration control is performed in all of the mobile objects at the same time, as illustrated in FIG. 4(b), the clearances between the mobile objects do not change and the clearances before the longitudinal acceleration control can be maintained. Therefore, for example, also in the case where an occupant rides in a following mobile object and the line of sight of the occupant is forward, anxiety or oppressing feeling is not given to the occupant due to approaching shift of the preceding mobile object.

Figure 5:
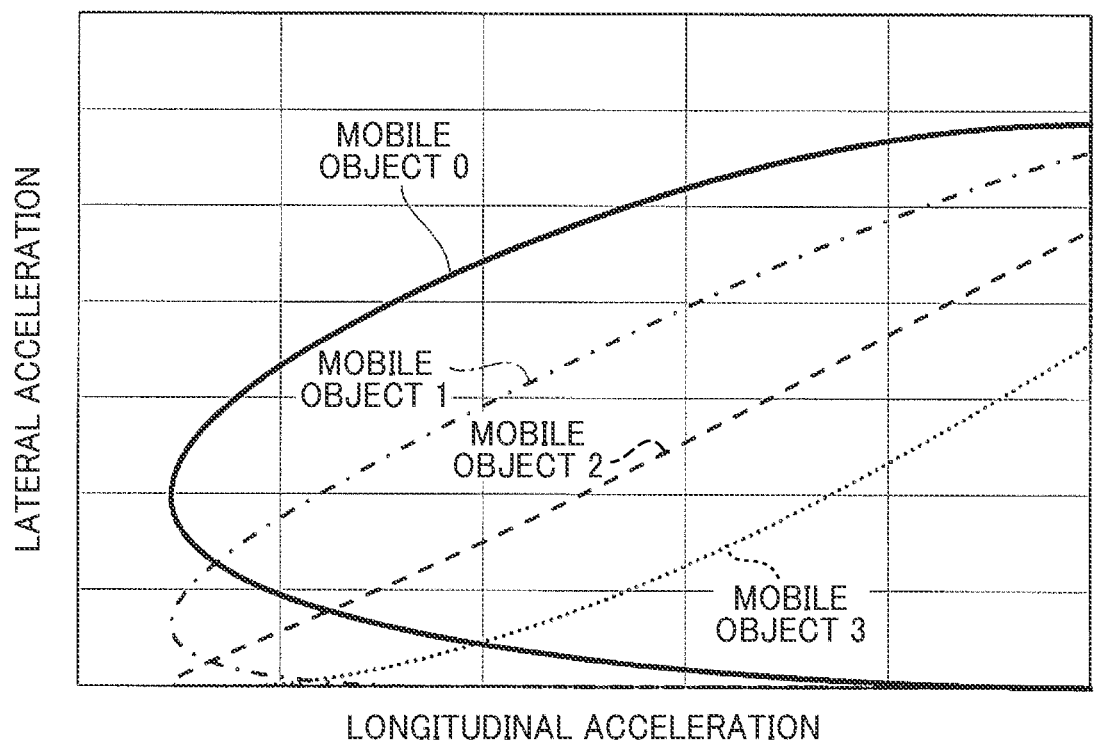
FIG. 5 is a diagram illustrating the relation between lateral acceleration and longitudinal acceleration of each of mobile objects at the time of traveling on a curved road when the longitudinal acceleration control for the platoon travel is performed in the reference method 2.

FIG. 5 is a "g-g" diagram illustrating the relation between the longitudinal acceleration and the lateral acceleration at this time. FIG. 5 is a diagram illustrating the relation between the lateral acceleration and the longitudinal acceleration of each of the mobile objects at the time of traveling on a curved road when the longitudinal acceleration control for the platoon travel is performed by the reference method 2.

It is understood from the relation of them that, although the motion of smoothly shifting from the longitudinal acceleration to the lateral acceleration is realized in the mobile object 0, negative longitudinal acceleration generated in a region in which the lateral acceleration is small becomes larger toward the tail end of following mobile objects (the mobile objects 1, 2, and 3), and the number of sections in which the longitudinal acceleration and the lateral acceleration are not coordinated increases. Therefore, with distance from the mobile object 0, the motion becomes more abrupt in the following mobile objects (mobile objects 1, 2, and 3). For example, in the case where an occupant rides in the following mobile object, ride comfort deteriorates and, in the case where cargo is loaded in the following mobile object, a cargo shifting is caused.

In the embodiment, a method is proposed that, while properly maintaining the clearances at the time of platoon travel so that the occupant does not feel anxiety or oppression due to approach of another mobile object, the longitudinal acceleration control that a longitudinal motion is coordinated with a lateral motion in the mobile object so that the ride comfort of the occupant becomes preferable in the mobile object in which the occupant rides in a platoon at the time of traveling on a curved road.

Figure 6:
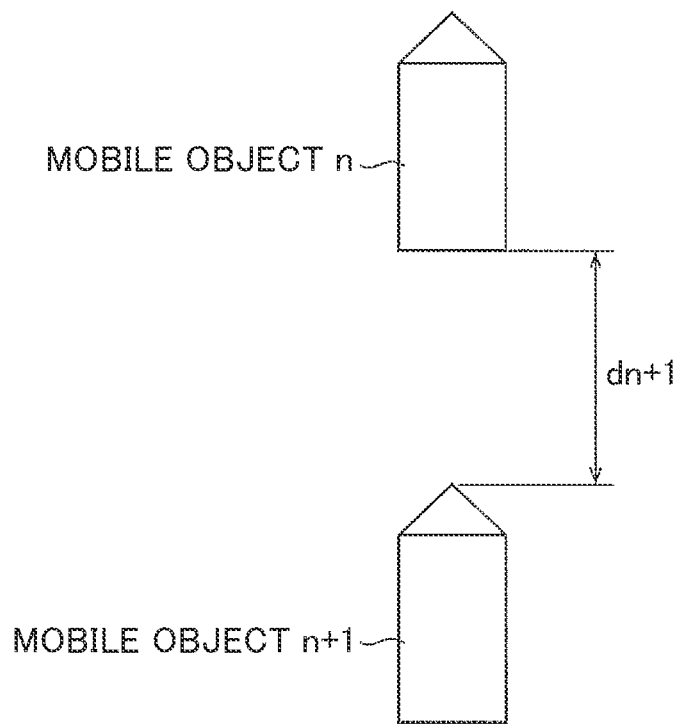
FIG. 6 is a diagram illustrating definition of a mobile object "n", a mobile object n+1, and clearance dn+1 between the mobile object "n" and the mobile object n+1.

Hereinafter, with reference to FIG. 6, FIGS. 7(a) and, 7(b), and FIGS. 8(a) to 8(c), characteristics of the longitudinal acceleration control in the embodiment will be described. In the description of FIGS. 7(a) and 7(b) and FIGS. 8(a) to 8(c), as illustrated in FIG. 6, in a plurality of mobile objects in a platoon, a preceding mobile object which travels ahead is set as a mobile object "n", a following mobile object which travels so as to follow the mobile object "n" (travels behind the mobile object "n") is set as a mobile object n+1, and the clearance between them is set as dn+1 (where n is a positive integer of 0 or larger).

First, referring to FIGS. 7(a) and 7(b), the longitudinal acceleration control in a travel scene of transition from a straight travel state to a steady turn state (before "a" in FIG. 1 to "b" in FIG. 1) will be described. FIG. 7(a) illustrates time changes in the lateral acceleration and the longitudinal acceleration of the mobile object "n" and the mobile object n+1 as a following mobile object which moves so as to follow the mobile object "n", and FIG. 7(b) illustrates time changes in the clearance dn+1 of them. As illustrated in FIG. 7(a), in each of the mobile objects "n" and n+1, negative longitudinal acceleration (that is, deceleration) is generated continuously since entry in the curve (the curvature of the travel path (≈ road curvature) increases), that is, before the lateral acceleration occurs (before time t3 in the mobile object "n", before time t4 in the mobile object n+1) until the steady turn (the curvature of the travel path (≈ road curvature) is constant), that is, time when the lateral acceleration becomes almost constant (time t5 in the mobile object "n", time t6 in the mobile object n+1). In the embodiment, the mobile object n+1 as the following mobile object starts deceleration before the absolute value of the lateral acceleration increases, that is, the turn is started, and the longitudinal acceleration at time t1 when deceleration starts is smaller than that generated in the mobile object "n" at the same time. That is, it is characterized that the longitudinal acceleration control is performed so that the deceleration generated in the mobile object n+1 as the following mobile object at the same time becomes larger than that generated in the mobile object "n" as the preceding mobile object.

More specifically, as will be described later, the mobile object n+1 as the following mobile object can obtain travel information of the mobile object "n" and starts deceleration by generating the negative longitudinal acceleration at time t1 before time t3 at which the absolute value of the lateral acceleration of the mobile object "n" increases, that is, the curvature of the travel path (≈ road curvature) of the mobile object "n" increases and a turn starts. In the example illustrated in FIG. 7(a), at time t2 which is after time t1 and before time t3, the mobile object "n" also starts deceleration by generating the negative longitudinal acceleration before the absolute value of the lateral acceleration of the mobile object "n" increases, that is, a turn starts. The negative longitudinal acceleration is generated to decrease the speed in the mobile objects "n" and n+1 between time t1 and time t3 so that the velocity of the mobile object n+1 at time t3 becomes smaller than that of the mobile object "n" at the same time (time t3). In such a manner, as illustrated in FIG. 7(b), the clearance dn+1 between the mobile objects is increased.

After that, in the section from time t3 to time t5, during which the preceding mobile object "n" enters the curve, the curvature of the travel path increases, the absolute value of the lateral acceleration increases, the curvature of the travel path becomes constant, and the steady turn is reached, the mobile object "n" performs, for example, like the G-vectoring control, the longitudinal acceleration control of obtaining a longitudinal motion coordinated with a lateral motion. Further, also in the following mobile object n+1, in the section from time t4 when the mobile object n+1 enters the curve to time t6, during which the curvature of the travel path increases, the absolute value of the lateral acceleration increases, the curvature of the travel path becomes constant, and the steady turn is reached, for example, like the G-vectoring control, the longitudinal acceleration control of obtaining a longitudinal motion coordinated with a lateral motion is performed. At this time, when the deceleration generated in the mobile object "n" is larger than that generated in the mobile object n+1 (for example, as illustrated in FIG. 7(a), when a control is performed so that the minimum value of the longitudinal acceleration of the mobile object n+1 generated in the section from time t4 to time t6 becomes larger than the minimum value of the longitudinal acceleration of the mobile object "n" generated in the section between time t3 to time t5), the clearance dn+1 between the mobile objects starts decreasing. In this case, the (negative) longitudinal acceleration of the mobile object "n" and/or the mobile object n+1 is controlled so that the clearance dn+1 between them decreases in the section (the section from time t4 to time t5) in which the absolute value of the lateral acceleration of the mobile object "n" increases and the absolute value of the lateral acceleration of the mobile object n+1 increases.

At time before the start of the longitudinal acceleration control for the curve, that is, before the deceleration start time t1 of the mobile object n+1, when the velocities of the mobile objects are the same, if an integration value of the longitudinal acceleration from time t2 to time t5 of the mobile object "n" and an integrated value from time t1 to time t6 of the mobile object n+1 are the same, the velocities at the time of steady turn of the mobile objects become the same, and the mobile objects turn at the same lateral acceleration. Further, by performing the longitudinal acceleration control of both of the mobile objects so that the integrated value from time t1 to time t6 of relative velocity ΔVn+1 of them becomes zero, at time t6 when the mobile object n+1 starts the steady turn, the clearance dn+1 between the mobile objects can be made the same as the clearance before time t1.

By the above operation, while realizing the longitudinal acceleration control generating a longitudinal motion coordinated with a lateral motion in each of the mobile objects "n" and n+1, for example, the clearance at the time of the steady turn can be made the same as the clearance before start of the turn.

Subsequently, referring to FIGS. 8(a) to 8(c), the longitudinal acceleration control in a travel scene (from "b" in FIG. 1 to "d" and after that in FIG. 1) of transition from the steady turn state to the straight travel state will be described.

In the travel scene, in addition to a positive longitudinal acceleration control coordinated with a lateral motion, a longitudinal acceleration control using the clearance between the mobile object "n" and the mobile object n+1 as a target value (target clearance) and a longitudinal acceleration control using the velocities of the mobile objects "n" and n+1 as target values (target velocities) are performed. FIG. 8(a) illustrates time changes in the lateral acceleration and the longitudinal acceleration of the mobile object "n" and the mobile object n+1 as a following mobile object of the mobile object "n" in the platoon, FIG. 8(b) illustrates time changes in the clearance dn+1 between the mobile objects, and FIG. 8(c) illustrates time changes in velocities of the mobile objects. As illustrated in FIG. 8(a), it is understood that, in each of the mobile objects "n" and n+1, the positive longitudinal acceleration is continuously generated (that is, acceleration is performed) from the steady turn in which the lateral acceleration is almost constant (the curvature of the travel path (≈ road curvature) is constant) (time t7 in the mobile object "n", time t8 in the mobile object n+1) to the time when the lateral acceleration becomes zero (time t9 in the mobile object "n", time t10 in the mobile object n+1). In each of the mobile objects, the positive longitudinal acceleration which is generated is increased from time t7 (mobile object "n") and t8 (mobile object n+1) at which the curvature of the travel path decreases and the absolute value of the lateral acceleration starts decreasing and, after that, the positive longitudinal acceleration is decreased as the velocity illustrated in FIG. 8(c) comes closer to the target velocity.

When the longitudinal acceleration of the mobile object "n" and that of the mobile object n+1 at this time are compared, the time when the positive longitudinal acceleration is generated in the preceding mobile object "n" (time t7) is earlier than that in the following mobile object n+1 (time t8). That is, as will be described later, the preceding mobile object "n" can obtain travel information of the following mobile object n+1. At time t7 which is before time t8 when the curvature of the travel path of the following mobile object n+1 decreases and the absolute value of the lateral acceleration starts decreasing, the position longitudinal acceleration is generated in the mobile object "n". Between time t7 and time t8, the positive longitudinal acceleration is generated to accelerate in the mobile objects "n" and n+1 so that the velocity of the mobile object n+1 at time t8 becomes smaller than the velocity of the mobile object "n" at the same time (time t8). Although the longitudinal acceleration of the mobile object n+1 in this section is zero in the example illustrated in FIG. 8(a), it does not always have to be zero. Time t11 at which the following mobile object n+1 reaches the target velocity and its longitudinal acceleration becomes zero is earlier than time t12 at which the preceding mobile object "n" reaches the target velocity and its longitudinal acceleration becomes zero. The (positive) longitudinal acceleration control of both of the mobile objects is performed so that the maximum value of the longitudinal acceleration generated in a turn transition period (from the steady turn state in which the curvature of the travel path is constant to the straight travel state in which the curvature of the travel path decreases and the absolute value of the lateral acceleration becomes zero) (from time t7 to time t9 in the mobile object "n", from time t8 to time t10 in the mobile object n+1) in the mobile object n+1 as the following mobile object becomes larger than that in the mobile object "n" as the preceding mobile object. At time t10 when the curvature of the travel path of the mobile object n+1 as the following mobile object decreases, the absolute value of the lateral acceleration decreases, and the absolute value of the lateral acceleration (or the curvature of the travel path) becomes a value from which straight travel can be estimated (in this case, about zero and a preset value) or less, the (positive) longitudinal acceleration of the mobile object n+1 and/or the mobile object "n" is controlled so that the velocity of the mobile object n+1 becomes larger than that of the mobile object "n" (refer to FIG. 8(c)).

By the above, as illustrated in FIG. 8(b), the clearance dn+1 between the mobile objects is increased first (in the example illustrated in FIG. 8(b), it is increased between time t9 and time t10) and, after that, the clearance dn+1 between the mobile objects decreases according to the acceleration of the following mobile object n+1.

Each of an integrated value of the longitudinal acceleration from time t7 to time t12 of the mobile object "n" and an integrated value from time 8 to time t11 of the mobile object n+1 is set so as to be the difference between the velocity before start of the positive longitudinal acceleration control and the target velocity and, further, the longitudinal acceleration control is performed so that the sum of an integrated value from time t7 to time t12 of relative velocity ΔVn+1 of both of them and the clearance at time t7 becomes the target clearance at the time of straight travel (after the curve). Consequently, when the longitudinal acceleration control for the curve is finished, each of the mobile object "n" and the mobile object n+1 can continue traveling with the target clearance.

By considering the longitudinal acceleration control using the clearance between the mobile objects "n" and n+1 as a target value and the longitudinal acceleration control using the velocities of the mobile objects "n" and n+1 as target values into the positive longitudinal acceleration control coordinated with a lateral motion at the time of transition from the steady turn to the straight travel, the number of increasing/decreasing times of the longitudinal acceleration can be decreased as compared with the case of performing the longitudinal acceleration controls separately. Therefore, when an occupant rides in the mobile objects "n" and n+1, improvement in the ride comfort of the occupant can be expected. When cargo is carried, a cargo shifting can be prevented.

Figure 9:
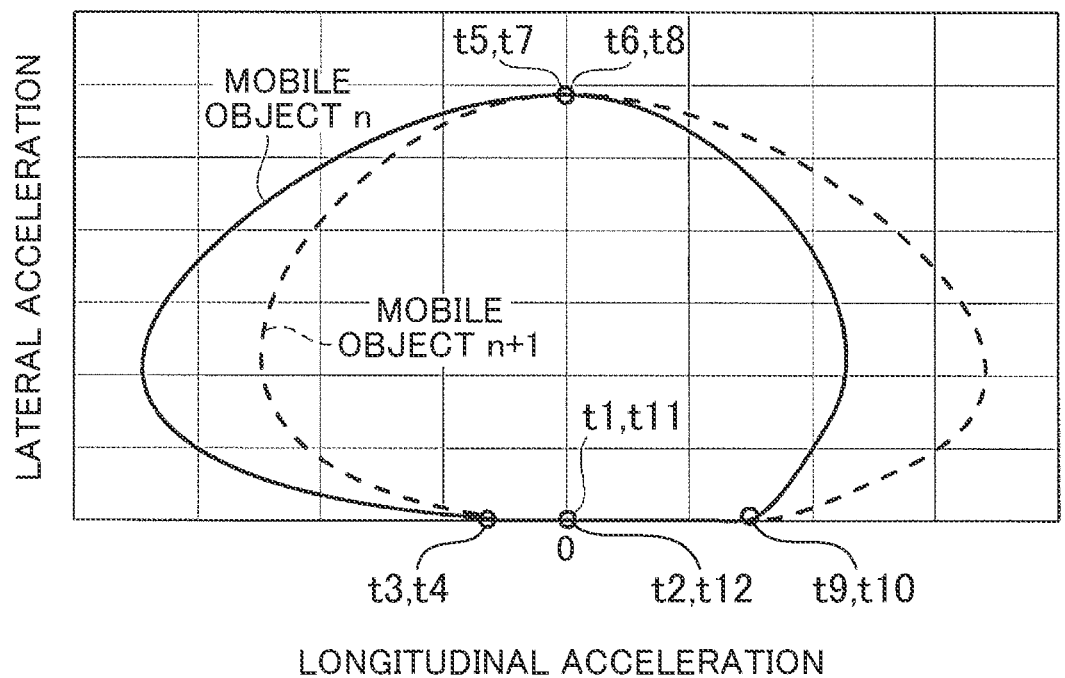
FIG. 9 is a diagram illustrating the relation between the longitudinal acceleration and the lateral acceleration when the longitudinal acceleration control according to the present invention is applied.

FIG. 9 is a "g-g" diagram illustrating the relation between the longitudinal acceleration and the lateral acceleration when the longitudinal acceleration control according to the present invention illustrated in FIGS. 7(a) and 7(b) and FIGS. 8(a) to 8(c) is performed. From FIG. 9, in both of the preceding mobile object "n" and the following mobile object n+1, the relation between the longitudinal acceleration and the lateral acceleration shifts from the origin 0 so as to draw a counterclockwise circle, and the acceleration change with excellent ride comfort in which the lateral motion and the longitudinal motion are coordinated can be provided to both of the mobile objects "n" and n+1.

Figure 11:
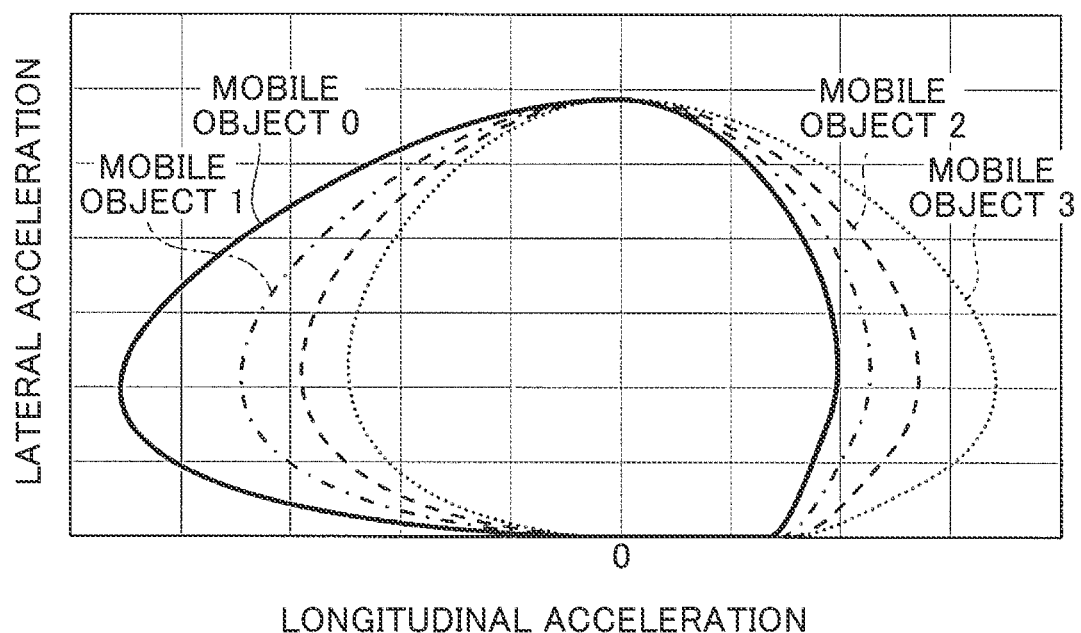
FIG. 11 is a diagram illustrating the relation between the longitudinal acceleration and the lateral acceleration of each of the mobile objects at the time of travelling on a curved road when the longitudinal acceleration control for platoon travel is performed in the present invention.

To confirm the above-described effect of the present invention, FIGS. 10(a) and (b) and FIG. 11 illustrate an example of providing the longitudinal acceleration control according to the present invention to the platoon travel of four mobile objects illustrated in FIG. 1. FIGS. 10(a) and 10(b) illustrate the longitudinal acceleration and the lateral acceleration of the mobile objects 0, 1, 2, and 3 and clearances between the mobile objects (mobile object 1–mobile object 0, mobile object 2–mobile object 1, mobile object 3–mobile object 2). FIG. 11 ("g-g" diagram) illustrates the relation between the longitudinal acceleration and the lateral acceleration of each of the mobile objects 0, 1, 2, and 3.

As illustrated in FIG. 10(a), different longitudinal acceleration controls for the curve road are performed to the mobile objects 0, 1, 2, and 3 which enter and exit from the curved road. As a result, as illustrated in FIG. 10(b), the clearance between the mobile objects (mobile object 1–mobile object 0, mobile object 2–mobile object 1, mobile object 3–mobile object 2) repeats increase/decrease twice for a period from before start of a turn to the end of the turn (concretely, an operation of creating the clearance once and, after that, shortening the clearance only by the created amount is performed) and finally converges to the initial clearance d0. In the example illustrated in FIG. 10(a), in a scene that the head mobile object starts decelerating for the curved road, the negative longitudinal acceleration is generated to start deceleration in order from the mobile object at the tail end of the platoon. Alternatively, as will be described later, the control may be performed so that the longitudinal acceleration generated becomes smaller (the deceleration is larger) towards the mobile object at the end. As illustrated in FIG. 11, the relation between the longitudinal acceleration and the lateral acceleration at this time is expressed by a shape which draws a circle from the origin 0 in all of the mobile objects (mobile objects 0, 1, 2, and 3) in the platoon.

As described above, by the longitudinal acceleration control of the present invention, also at the time of passing a curved road by platoon travel, while maintaining a predetermined clearance or larger, the acceleration change in which the lateral motion and the longitudinal motion are coordinated and by which the ride comfort is excellent and a cargo shifting is prevented can be provided to all of the mobile objects in the platoon.

The longitudinal acceleration control method at the time of passing a curved road in platoon travel is not limited to the above-described method but may be a method of controlling the longitudinal acceleration of the mobile object n+1 or both of the mobile objects "n" and n+1 so that the clearance dn+1 between the mobile object "n" traveling ahead in a platoon and the mobile object n+1 following the mobile object "n" increases before the absolute value of the lateral acceleration of the mobile object n+1 or the curvature of a travel path (a path on which the mobile object n+1 is to travel on a road path) (≈ road curvature) increases and controlling the longitudinal acceleration of the mobile object "n" and n+1 so that the velocity of the mobile object n+1 becomes smaller than the velocity of the mobile object "n" before the absolute value of the lateral acceleration of the mobile object n+1 or the curvature of the travel path starts increasing (that is, in/after a section in which the absolute value of the lateral acceleration of the mobile objects "n" and n+1 or the curvature of the travel path increases). Alternatively, the method may be a method of controlling the longitudinal acceleration of a mobile object "n" traveling ahead in a platoon or both of the mobile object "n" and a following mobile object n+1 so that a clearance dn+1 between the mobile objects increases before the absolute value of the lateral acceleration of the following mobile object n+1 or the curvature of a travel path (≈ road curvature) decreases and controlling the longitudinal acceleration of the mobile objects "n" and n+1 so that the velocity of the mobile object n+1 becomes smaller than the velocity of the mobile object "n" when the absolute value of the lateral acceleration of the mobile object n+1 or the curvature of the travel path starts decreasing (that is, in/after a section in which the absolute value of the lateral acceleration of the mobile object and the mobile object n+1 or the curvature of the travel path decreases). As a method other than that illustrated in FIG. 7(a), for example, a method of increasing a clearance dn+1 between mobile objects "n" and n+1 before the absolute value of the lateral acceleration of the following mobile object n+1 increases by setting time t1 and time t2 in FIG. 7(a) to the same timing, and setting negative lateral acceleration generated in the mobile object n+1 to a smaller value (larger deceleration) as compared with the negative longitudinal acceleration generated in the mobile object "n" may be employed. As a method other than that illustrated in FIG. 8(a), for example, a method of increasing a clearance dn+1 between mobile objects "n" and n+1 before the absolute value of the lateral acceleration of the mobile object n+1 decreases by generating longitudinal acceleration in the mobile object "n", which is larger than that in the mobile object n+1 (in which the longitudinal acceleration may not be zero), for example, in FIG. 8(a), at a timing earlier than time t7 may be employed.

In the embodiment, a control of adjusting the longitudinal acceleration of each of mobile objects in platoon travel in accordance with the kind or state of a carried object is performed. For example, a control of adjusting the longitudinal acceleration of the mobile object n+1 in accordance with whether an occupant rides on the mobile object n+1 or not, in the case where an occupant rides in the mobile object n+1, in accordance with whether or not the occupant of the mobile object n+1 grazes the mobile object "n" ahead. Concretely, in the case where an occupant rides on the mobile object n+1, a control of adjusting the longitudinal acceleration so as to increase/decrease the clearance dn+1 more gently from a period before entry of a curve until a steady turn as compared with the case where no occupant rides is performed. In the case where the occupant in the mobile object n+1 grazes the mobile object "n" ahead, a control of adjusting the longitudinal acceleration so as to increase/decrease the clearance dn+1 more gently from a period before entry of a curve until a steady turn as compared with the case where the occupant does not gaze is performed. In the case where cargo requiring careful and gentle handling such as precision machines and perishable food is loaded on the mobile object n+1, a control of adjusting the longitudinal acceleration so as to increase/decrease the clearance dn+1 more gently as compared with the case that no such cargo is loaded is performed. Further, in the case where the mobile object n+1 is construction machine such as a dump truck and a carriage object such as earth and sand is loaded and the position of gravity center is high, a control of correcting the longitudinal acceleration is performed so as to increase/decrease the clearance dn+1 for a period before entry to a curve until a steady turn more gently as compared with the case where no such carriage object is loaded and the position of gravity center is low.

Mobile Object Control System

Hereinafter, with reference to FIGS. 12 to 27, the configuration and operation of a mobile object control system 1 according to the embodiment will be described.

The mobile object control system 1 of the embodiment shares travel information of each of mobile objects 21 in a platoon by a mobile object motion control device 1A and individually controls the longitudinal accelerations of the mobile objects 21 in the platoon. Each of the mobile objects 21 has an autonomous driving device performing autonomous driving on the basis of a control command output from the mobile object motion control device 1A. The mobile object motion control device 1A performs a control of adjusting the longitudinal acceleration of each of the mobile objects 21 in accordance with the presence/absence of a thing to be carried, the content, characteristic, and the like of the thing to be carried.

First, referring to FIGS. 12, 13, 14, and 15, the configuration of the mobile object control system according to the embodiment will be described.

Figure 12:
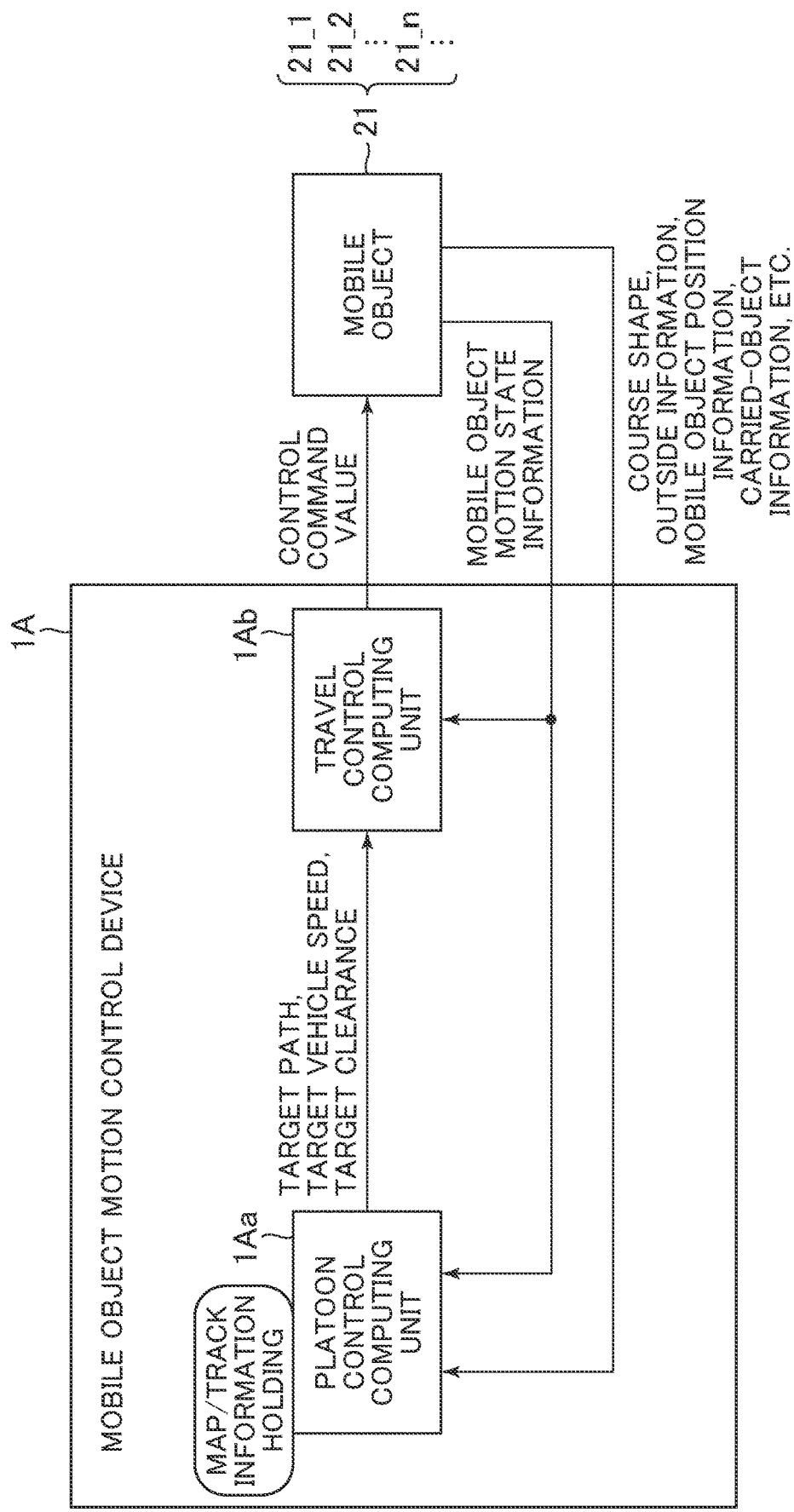
FIG. 12 is a conceptual diagram of an entire system in which an embodiment of the mobile object control system according to the present invention is mounted.

FIG. 12 is a conceptual diagram of an entire system in which an embodiment of the mobile object control system according to the present invention is mounted.

The mobile object control system 1 is configured by the mobile object motion control device 1A and the plurality of mobile objects 21. The mobile object control system 1 transmits and receives information between the mobile object motion control device 1A and the plurality of mobile objects 21, and performs a control of making the plurality of mobile objects 21 platoon-travel as a single mobile object group by the mobile object motion control device 1A. Although the mobile object motion control device 1A is provided on the outside of the mobile objects 21 in the example illustrated in FIG. 12, it may be provided in the mobile objects 21 which travel in a platoon. It may be also provided in a controller of a control center which controls the mobile objects 21 from the outside.

The mobile object motion control device 1A has a computing device having a storage area, arithmetic processing capability, signal input/output means, and the like and has, as internal functions, a platoon control computing unit 1Aa and a travel control computing unit 1Ab.

The platoon control computing unit 1Aa obtains a course shape, outside information, mobile object position information, carried-object information, and mobile object motion state information from each of the mobile objects 21 and, on the basis of the information, generates target path, target speed, and target clearance of each of the mobile objects 21 which are made travel in a platoon. When traffic information of the area in which the mobile objects 21 travel in a platoon can be obtained as an input to the mobile object motion control device 1A, the traffic information may be input to the platoon control computing unit 1Aa and target path, target speed, and target clearance of each of the mobile objects 21 may be generated.

The travel control computing unit 1Ab computes a longitudinal acceleration command value as a control command value which generates longitudinal acceleration from the target path, target speed, target clearance, mobile object motion state information, and the like generated by the platoon control computing unit 1Aa individually for each of the mobile objects 21 and transmits the command value to each of the mobile objects 21.

Mobile Object 21

The mobile object 21 is a mobile object capable of traveling while loading a carriage object such as a person or cargo. In the embodiment, there is a condition that at least one mobile object which transports a human exists in the plurality of mobile objects 21 constructing a platoon. The mobile object 21 is, for example, a general vehicle, a commercial vehicle, a bus (including a new mobility capable of transporting a human), a construction machine (such as a dump truck), or the like or, for example, an unmanned carrier which automatically carries cargo and parts. A mobile object group formed by a plurality of mobile objects 21 which travel in a platoon is not limited to a group of the same kind of mobile objects 21 but can be also configured by a combination of different kinds of mobile objects 21. For example, a platoon can be formed by mixing a general vehicle and an unmanned carrier.

Figure 13:
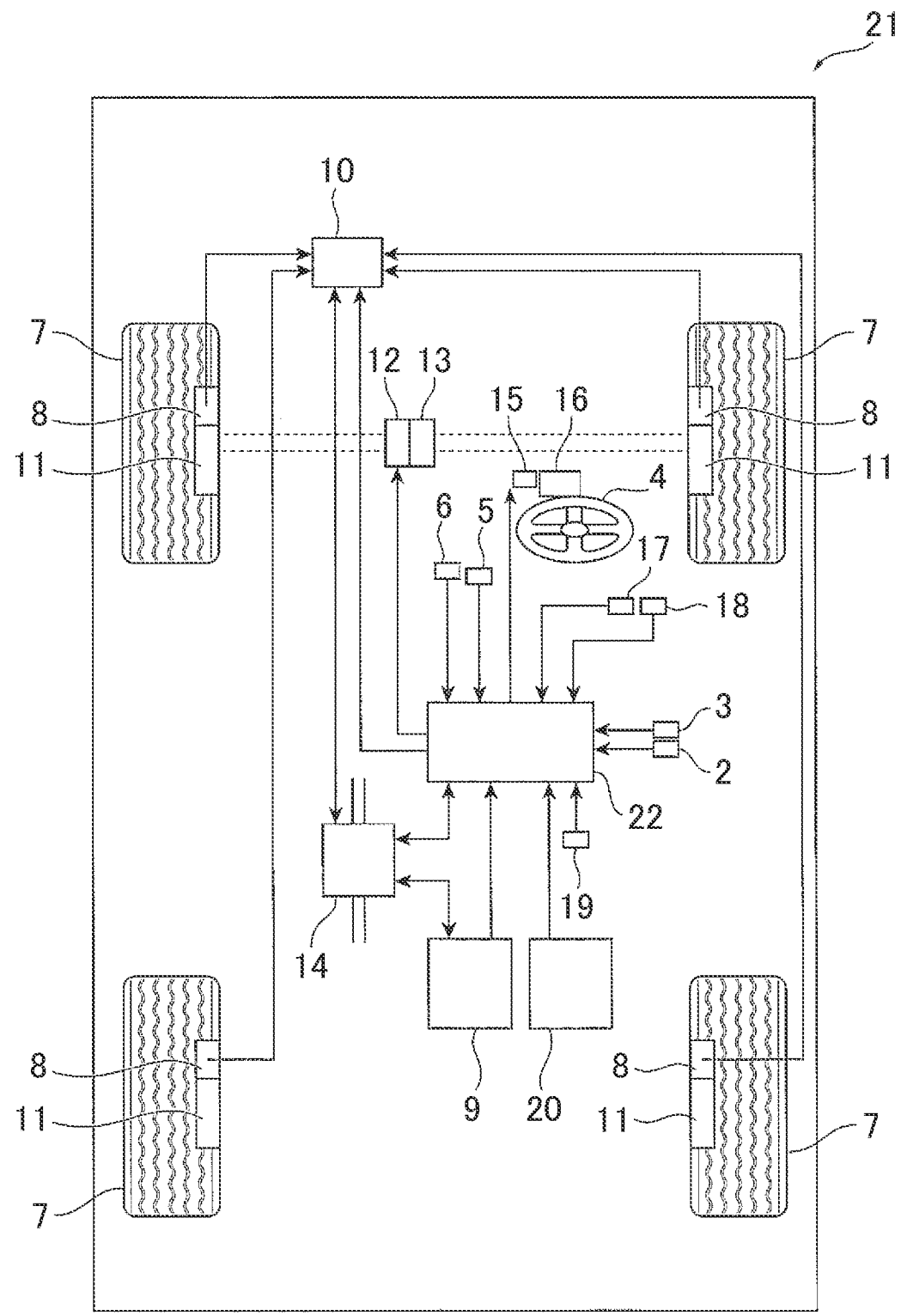
FIG. 13 is a conceptual diagram illustrating an example of a mobile object in the embodiment of the mobile object control system according to the present invention.

FIG. 13 is a conceptual diagram illustrating an example of a mobile object in an embodiment of a mobile object control system according to the present invention. The mobile object 21 illustrated in FIG. 13 is a vehicle capable of moving while carrying a plurality of occupants and has an autonomous driving device performing autonomous driving on the basis of a control command value transmitted from the mobile object motion control device 1A.

When a control command value is received from the mobile object motion control device 1A, the mobile object 21 transmits the control command value to control units (a brake control unit 10, a drive torque control unit 12, and a steering control unit 15) performing the drive control on actuators (a brake actuator 11, a drive actuator 13, and a steering control actuator 16) capable of controlling longitudinal acceleration and/or lateral acceleration generated in the mobile object 21 itself via a communication line 14.

The mobile object 21 obtains various information from an exterior communication unit 20 or the like which transmits/receives information by communication with sensors for obtaining mobile object motion state information (an acceleration sensor 2, a gyroscope sensor 3, and a wheel speed sensor 8), sensors for obtaining driver operation information (a steering angle sensor 5, a brake pedal sensor 17, and an accelerator pedal sensor 18), a sensor for obtaining information of a carriage object carried by the mobile object 21, sensors for obtaining travel road information of a travel road on which the mobile object 21 travels (a course shape obtaining sensor 6, a position detecting sensor 9, and an outside information detecting sensor 19), and a control device other than the mobile object itself, and transmits the information to the mobile object motion control device 1A.

The sensor for obtaining mobile object motion state information may be a sensor or means capable of obtaining mobile object speed, longitudinal acceleration, lateral acceleration, and yaw rate and is not limited to the above-described sensor configurations. For example, by differentiating position information obtained by a global positioning system (GPS), the mobile object speed may be obtained. By using an image obtaining sensor such as a camera, the yaw rate, longitudinal acceleration, and lateral acceleration of a mobile object may be obtained. The mobile object 21 does not have to directly have an input of a sensor. For example, necessary information may be obtained via the communication line 14 from another control unit (for example, the brake control unit 10).

It is sufficient for the sensor for obtaining driver operation information to obtain an operation amount of a steering wheel 4 by the driver and operation amounts of a brake pedal and an accelerator pedal which are not illustrated. In a manner similar to the above-described acquisition of the mobile object motion state information, the mobile object 21 does not have to directly have an input of a sensor. For example, necessary information may be obtained via the communication line 14 from another control unit (for example, the brake control unit 10).

The sensor for obtaining carriage object information of the mobile object 21 is configured by a camera for imaging or an infrared ray sensor or a laser sensor for sensing the inside of the mobile object 21 and the inside of luggage room. Information such as whether a carriage object such as an occupant or cargo rides in the mobile object 21, whether there is no occupant and no cargo, when there is a carriage object, the content or kind of the carriage object, in the case of an occupant, the direction and the orientation of the occupant, and the direction of sight line is obtained. The information may be obtained, not necessarily by providing the input of the sensor, for example, from predetermined information input means.

The mobile object 21 uses, as the sensor for obtaining travel road information, a global positioning system (GPS) as the self-position detecting sensor 9, uses a sensor capable of detecting a travelable region by detecting an obstacle around itself, such as a camera or a radar as the outside information detecting sensor 19, and can use a sensor capable of obtaining travel path information of itself like a navigation system as the course shape obtaining sensor 6. The sensor for obtaining the mobile object travel road information of the mobile object itself may be means capable of obtaining a course shape (also called a road shape) and outside information (travelable region) in the travel direction of the mobile object itself and is not limited to the above-described sensors. It may be, for example, a method of obtaining a course shape ahead of the mobile object 21 itself by communication with the mobile object motion control device 1A or a device which transmits road information mounted on the road, or a method of obtaining an image of the forward and/or an image of the periphery of the mobile object 21 itself by imaging means such as a camera and obtaining a course shape ahead of the mobile object itself. It may be a method of obtaining a course shape via the communication line 14 from a unit computing a course shape in the travel direction of the mobile object 21 itself by any of the above-described means or combination of the above-described means.

The exterior communication unit 20 transmits/receives a signal by communication with the mobile object motion control device 1A mounted on the outside of the mobile object by wireless or wired communication. The communication method may be a communication method by radio communication means such as a cellular line or WiFi (registered trademark), or a communication method by direct contact via another mobile object or a road-surface-side infrastructure system and a telegraph cable. The mobile object 21 can output (transmit) its travel information (mobile object information) via the exterior communication unit 20 to the mobile object motion control device 1A and input (receive) a control command from the mobile object motion control device 1A. The travel information (mobile object information) includes a travel path, velocity, a longitudinal acceleration control plan, a clearance with another mobile object, and the like.

The mobile object 21 may obtain a travel data path in the past of a road surface on which the mobile object 21 travels by communication with the mobile object motion control device 1A by the exterior communication unit 20. The mobile object information may be obtained by using a camera, a radar, or the like as the outside information detecting sensor 19 mounted in the mobile object 21 without using the exterior communication unit 20.

The acceleration/deceleration actuator capable of controlling longitudinal acceleration which occurs in the mobile object 21 is an actuator capable of controlling the longitudinal acceleration which occurs in the mobile object 21 by controlling the force generated between a tire 7 and the road surface. For example, an acceleration/deceleration actuator capable of controlling the longitudinal acceleration can be applied such as a combustion engine capable of controlling the longitudinal acceleration of the mobile object 21 by controlling driving/braking torque applied on the tires 7 by controlling a combustion state, an electric motor capable of controlling the longitudinal acceleration of the mobile object 21 by controlling the driving/braking torque applied on the tires 7 by controlling current, a transmission capable of controlling the longitudinal acceleration of the mobile object 21 by changing the transmission gear ratio at the time of transmitting the power to each of the wheels, or a friction brake generating the longitudinal acceleration in the mobile object 21 by pressing a brake disc against a brake pad of each of the wheels.

When a longitudinal acceleration command value is received from the mobile object motion control device 1A, the mobile object 21 transmits the longitudinal acceleration command value to the drive controllers (the brake control unit 10 and the drive torque control unit 12) of the acceleration/deceleration actuators (the brake actuator 11 and the drive actuator 13) using the acceleration/deceleration actuators capable of generating the longitudinal acceleration as longitudinal acceleration generating means. When a lateral motion command value is received from the mobile object motion control device 1A, the mobile object 21 transmits a steering command value as the lateral motion command value to the drive controller (the steering control unit 15) of the steering control actuator 16 using the steering control actuator 16 capable of generating the lateral motion as turn motion generating means.

A signal received by the mobile object 21 from the mobile object motion control device 1A may not be a signal of a forward acceleration velocity itself but may be a signal capable of realizing the lateral acceleration command value by the acceleration/declaration actuator. Similarly, a signal received from the mobile object motion control device 1A by the mobile object 21 may not be a steering angle itself but may be a signal which can realize a steering command value by the steering control actuator 16.

For example, in the case where the acceleration/deceleration actuator is a combustion engine, a braking/driving torque command value capable of realizing the longitudinal acceleration command value is transmitted to the drive torque control unit 12. Without the drive torque control unit 12, a combustion engine drive signal realizing the acceleration command value may be transmitted directly to a control actuator of a combustion engine. In the case of using a hydraulic friction brake which hydraulically presses a brake pad against a brake disc, a hydraulic command value realizing the acceleration command value is transmitted to the brake control unit 10. A drive signal of a hydraulic friction brake drive actuator realizing the longitudinal acceleration command value may be transmitted directly to the hydraulic friction brake drive actuator not through the brake control unit 10.

At the time of realizing the longitudinal acceleration command value, the acceleration/deceleration actuator which controls a drive control in accordance with the longitudinal acceleration command value may be changed.

For example, in the case where the combustion engine and the hydraulic friction brake are provided as the acceleration/deceleration actuator, in the range that the longitudinal acceleration command value can be realized by a braking/driving torque of the combustion engine, the combustion engine is driven and controlled. In the case where the longitudinal acceleration command value is a negative value in the range that it cannot be realized by the braking/driving torque of the combustion engine, the hydraulic friction brake is driven and controlled together with the combustion engine. In the case where the electric motor and the combustion engine are provided as the acceleration/deceleration actuators, when the time change in the longitudinal acceleration is large, the electric motor may be driven and controlled, and when the time change in the longitudinal acceleration is small, the combustion engine may be driven and controlled. In the case where the longitudinal acceleration command value is driven and controlled by the electric motor in normal times, and when the longitudinal acceleration command cannot be realized by the electric motor due to the battery state or the like, another acceleration/deceleration actuator (the combustion engine, the hydraulic friction brake, or the like) may be driven and controlled.

As the communication line 14, communication lines and communication protocols which are different depending on signals may be used. For example, a configuration of using Ethernet for communication with a sensor which obtains own-mobile-object travel road information, which has to transmit/receive a large amount of data and using CAN (Controller Area Network) for communication with each of the actuators may be employed.

Mobile Object Motion Control Device 1A

The mobile object motion control device 1A has a computing device having a storage region, computing process capability, signal input/output means, and the like, computes a longitudinal acceleration command value generated in each of the mobile objects 21 by using various information obtained from the mobile objects 21 such as mobile object motion state information, driver operation information, and own-mobile-object travel road information, and transmits the control command value to each of the mobile objects 21. The mobile object motion control device 1A computes a lateral motion command value generated in each of the mobile objects 21 from various information obtained by the mobile object motion state information, the driver operation information, the own-mobile-object travel road information, and the like, and transmits it to each of the mobile objects 21.

The control command value transmitted from the mobile object motion control device 1A to each of the mobile objects 21 may be the longitudinal acceleration command value itself or a control parameter which can be computed so as to realize the longitudinal acceleration command value in the drive controllers (the brake control unit 10 and the drive torque control unit 12) of the acceleration/deceleration actuators (the brake actuator 11 and the drive actuator 13) mounted in the mobile object 21.

Specifically, the same control algorithm as the longitudinal acceleration control command value computation for a curved road performed in the travel control computing unit 1Ab is provided in an automatic operation control device 22 mounted in the mobile object 21, and the travel control computing unit 1Ab may transmit control parameters such as the gain and threshold of the control algorithm.

When the longitudinal acceleration control ranges of the mobile objects 21 in the platoon mobile objects, that is, the longitudinal acceleration maximum values and the longitudinal acceleration minimum values which can be generated by the longitudinal acceleration control are different among mobile objects, all of the clearances do not have to be the same. According to the longitudinal acceleration control range which can be controlled by a mobile object 21_*n* and the following mobile object 21_*n*+1, a target clearance Dtgt_n+1 between the mobile object 21_*n* and the following mobile object 21_*n*+1 may be changed. That is, the maximum longitudinal acceleration and the minimum longitudinal acceleration which can be generated in each of the mobile objects 21 in platoon travel and the target clearance between the mobile object 21_*n* and the following mobile object 21_*n*+1 may be set and the target clearance may be changed according to the maximum longitudinal acceleration and/or the minimum longitudinal acceleration.

Concretely, for example, when the minimum longitudinal acceleration of the following mobile object 21_$n$+1 is smaller than that of the mobile object 21_$n$, that is, the controllable range of negative longitudinal acceleration of the following mobile object 21_$n$+1 is wider than that of the mobile object 21_$n$, the target clearance Dtgt_n+1 is set to a value larger than the target clearance Dtgt_n with the mobile object 21_$n$−1 ahead as the mobile object followed by the mobile object 21_$n$. The controllable range of the longitudinal acceleration is a value which is set in consideration of the ride comfort of an occupant in addition to the restriction by the actuator of the mobile object. The controllable range of the longitudinal acceleration in the case where there is no occupant in the mobile object may be set to a value larger than that in the case where there is an occupant in the mobile object.

Platoon Control Computing Unit 1Aa

Figure 14:
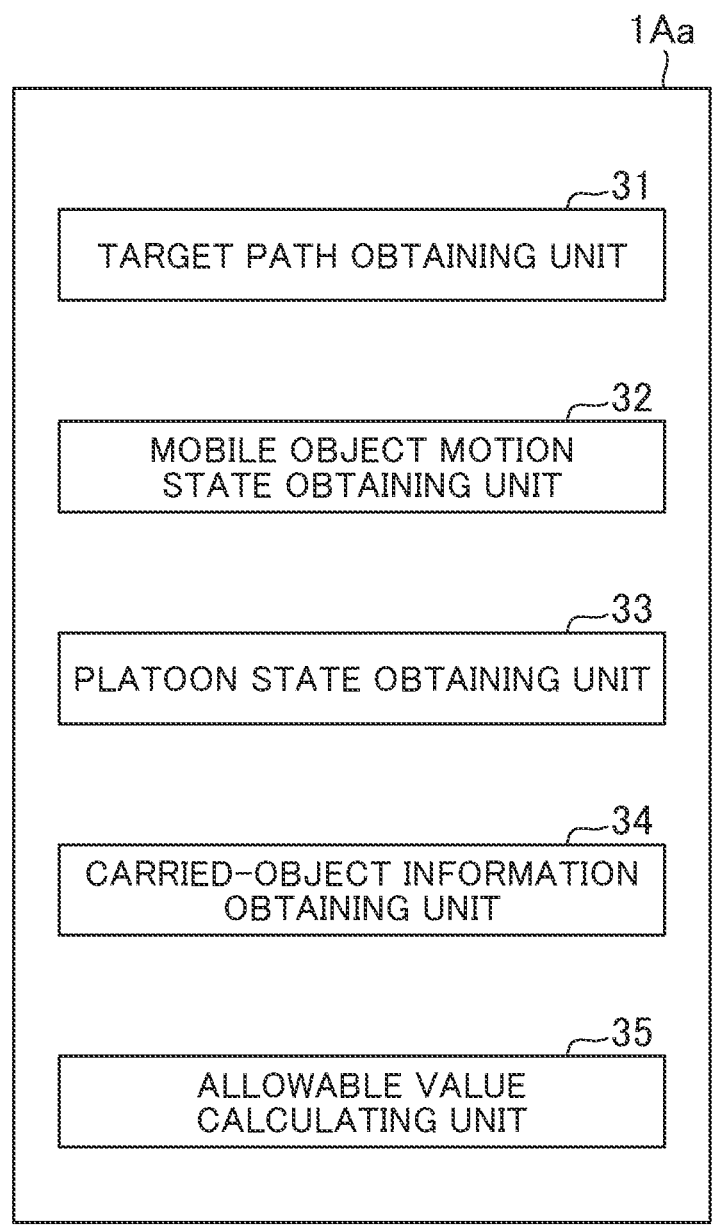
FIG. 14 is a diagram illustrating the configuration of a platoon control computing unit of a mobile object motion control device in the embodiment of the mobile object control system according to the present invention.

FIG. 14 is a block diagram illustrating internal functions of the platoon control computing unit.

In the platoon control computing unit 1Aa, a process of computing a target path, a target velocity, and a target clearance for making the mobile objects 21 travel in a platoon on the basis of course shape, outside information, mobile object position information, mobile object motion state information, platoon state information, and carried-object information is performed. The platoon control computing unit 1Aa has a target path obtaining unit 31, a mobile object motion state obtaining unit 32, a platoon information obtaining unit 33, a carried-object information obtaining unit 34, and an allowable value calculating unit 35.

Target Path Obtaining Unit 31

The target path obtaining unit 31 obtains a target path (travel path) and a travelable region for making the mobile objects 21 as a mobile object group travel in a platoon from mobile object travel road information (course shape and outside information) and mobile object motion state information. The target path (travel path) is a path on which each of the mobile objects 21 is to travel on a course (road) path. As a method of generating the target path, a method of generating a target path from the shape of a course on which each of the mobile objects 21 travels or a method of obtaining a travel data path in the past of a road face on which each of the mobile objects 21 travels by communication with an external device and generating a target path on the basis of the obtained path may be employed.

The target path obtaining unit 31 generates information of a target path which defines a path on which the mobile object 21 travels on the basis of outside information and the mobile object motion allowable value calculated by the allowable value calculating unit 35. The information of the target path is information including a path L on which the mobile object 21 travels and passage time "t" of the mobile object 21 in a predetermined position. The information of the target path may not be specified by the passage time information in a predetermined position but may be specified by information of target speed in a predetermined position. The path L is, concretely, coordinates of a target longitudinal position and a target lateral position set on a target route, which are specified every predetermined interval.

In the case where a longitudinal acceleration allowable value $C_{Ax}$ calculated by the allowable value calculating unit 35 is small, the target travel speed of the mobile object 21 in the target track is decreased generally. It can make the vehicle 20 travel without causing large acceleration/deceleration. In the case where a lateral acceleration allowable value $C_{Ay}$ calculated by the allowable value calculating unit 35 is small, the curvature of the target path is decreased.

Consequently, the mobile object 21 can travel without causing large lateral acceleration Ay.

Similarly, in the case where a yaw rate allowable value $C_{Ry}$ calculated by the allowable value calculating unit 35 is small, the curvature of the target path is decreased. It can make the mobile object 21 travel without accompanying sudden yaw motion.

Mobile Object Motion State Obtaining Unit 32

The mobile object motion state obtaining unit 32 obtains a motion state (travel speed, turn state, driver operation amount, and the like) from the mobile object motion state information.

Platoon Information Obtaining Unit 33

The platoon information obtaining unit 33 obtains travel information (mobile object information) of each of the mobile objects 21 by communication by the exterior communication unit 20 or the like. The platoon information obtaining unit 33 obtains, as platoon information, information such as the position in a platoon, travel path, speed, longitudinal acceleration control plan, and clearance between mobile objects 21. The platoon information obtaining unit 33 may obtain, as the platoon information, a platoon continuable flag in addition to the above-described information.

Carried-Object Information Obtaining Unit 34

The carried-object information obtaining unit 34 obtains information of an object carried by the mobile object 21. The carried-object information can be obtained, for example, from each of the mobile objects 21 or may be obtained by communication with an external device. The carried-object information includes, for example, information of cargo loaded in the mobile object 21 and, in the case where an occupant rides, information such as the direction of the gaze of the occupant.

For example, on the basis of the information of the inside of the mobile object 21 obtained from an in-vehicle sensor such as a camera, the ride position and the action of the occupant, the orientation of the body of the occupant (occupant direction $D_H$) and the like are estimated. Concrete examples of the occupant action are sleeping, reading, video watching and the like.

Figure 16:
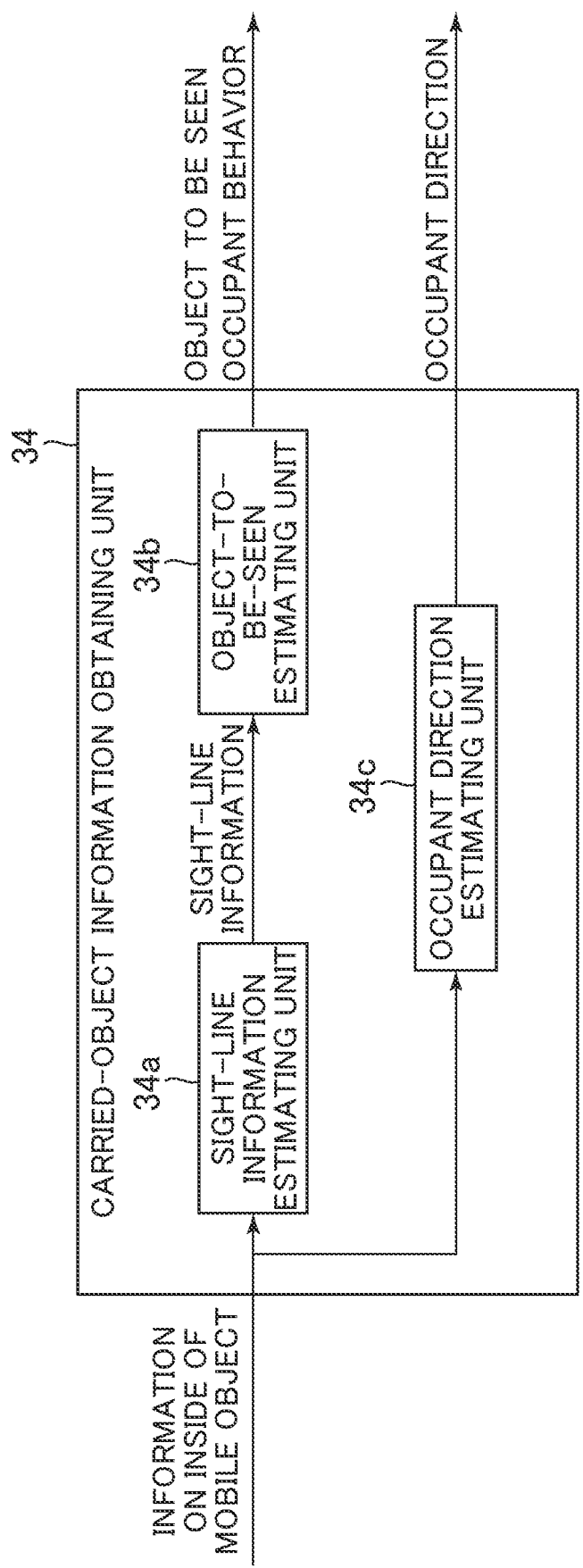
FIG. 16 is a block diagram illustrating a main part of a carried-object information obtaining unit.

FIG. 16 is a block diagram illustrating a main part of the carried-object information obtaining unit 34. As illustrated, the carried-object information obtaining unit 34 has a sight line information estimating unit 34a, a visual recognition target estimating unit 34b, and an occupant direction estimating unit 34c.

The sight line information estimating unit 34a detects or estimates the line of sight of the occupant on the basis of information of the inside of the mobile object 21 obtained from the in-vehicle sensor. For example, the eye movement of the occupant is traced by a camera, and information of the line of sight may be estimated.

The visual recognition target estimating unit 34b detects or estimates the object to be visually recognized by the occupant and the action of the occupant on the basis of the visual line information output from the sight line information estimating unit 34a. In this case, first, the object to be visually recognized by the occupant exists either on the outside of the mobile object or inside of the mobile object is determined. When it is estimated that the object to be visually recognized by the occupant is on the outside of the mobile object, without finely classifying the object to be visually recognized, the object to be visually recognized is set as the object on the outside of the mobile object. The occupant action is not also finely classified and is set as visual recognition on the outside of the mobile object.

On the other hand, when it is estimated that the object to be visually recognized by the occupant exists in the mobile object, the object to be visually recognized and the occupant action are specifically determined. Examples of the object to be visually recognized are a book, a document, a display, a conversational partner, and the like. As the methods of determining an object to be visually recognized, a method of estimating an object existing at the line of sight of the occupant from a database and a method of estimating an object from a learning model (deep learning using image information as an input, or the like) can be mentioned. At the same time, whether the occupant grasps an object to be visually recognized or not is also determined. An occupant action is also estimated on the basis of visual line information and visual recognition object information. An occupant action may be directly estimated also from a learning model of estimating an occupant action.

The occupant direction estimating unit 34c estimates the direction of the body of the occupant (an occupant direction $D_H$ relative to a travel direction $D_C$ of the mobile object) on the basis of the information of the inside of the mobile object obtained from the in-vehicle sensor.

Allowable Value Calculating Unit 35

The allowable value calculating unit 35 determines a mobile object motion allowable value C as a motion control value of a mobile object allowed so that the occupant does not feel uncomfortable on the basis of occupant information (object to be visibly recognized, occupant action, occupant direction, and the like) obtained from the carried-object information obtaining unit 34. The mobile object motion allowable value C is, concretely, an allowable value of each of a longitudinal acceleration Ax, a lateral acceleration Ay, a vertical acceleration Az, a yaw rate Ry, a roll rate Rr, a pitch rate Rp, and the like as physical amounts expressing mobile object motion information.

Figure 17:
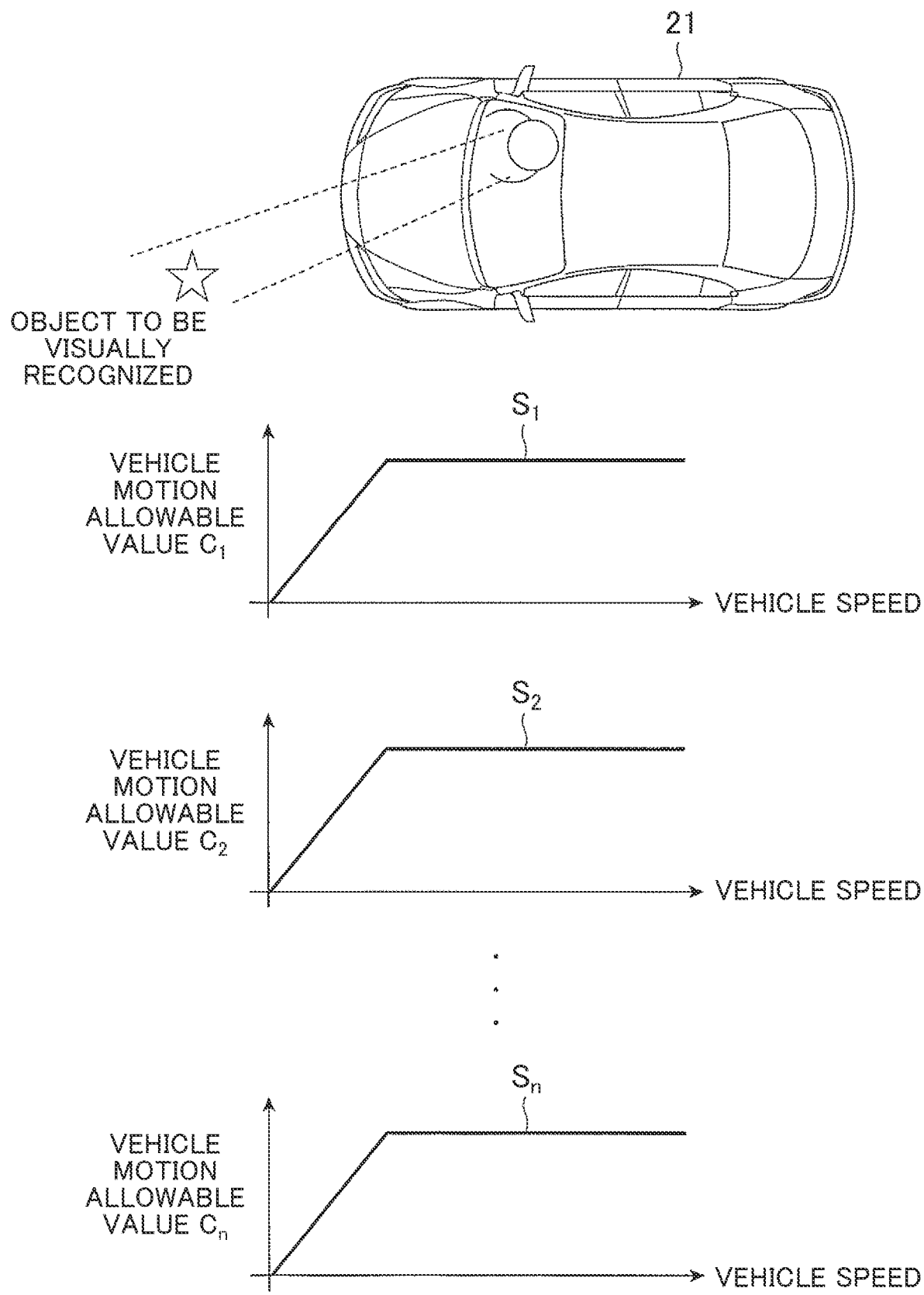
FIG. 17 is a diagram provided as an operation example of the case where an object to be visually recognized of an occupant exists on the outside of a mobile object.

For example, as illustrated in FIG. 17, when an object to be visually recognized (indicated by a star mark in the diagram) by an occupant exists on the outside of the mobile object, regardless of whether the ride position of the occupant is the driver's seat or a backseat, mobile object motion allowable values $C_1$ to $C_n$, are set to reference values $S_1$ to $S_n$. A reference value S is a threshold of a physical amount at which an occupant generally feels uncomfortable and, for example, in the case of the longitudinal acceleration Ax, it is ±0.2 G. As illustrated in FIG. 17, the reference value S is set so as to increase in proportion to the speed at the time of low speed and, after it reaches a predetermined speed, become constant.

On the other hand, when the object to be visually recognized (star mark) of the occupant exists in the mobile object as illustrated in FIG. 18, the mobile object motion allowable value C is set to a suppression value S' smaller than the reference value S. That is, suppression values $S'_1$ to $S'_n$ smaller than the reference values $S_1$ to $S_n$ are set to mobile object motion allowable values $C_1$ to $C_n$, respectively.

For example, in the case where an object to be visually recognized is grasped by the occupant, when the longitudinal acceleration Ax and the vertical acceleration Az are generated, the line of sight is waved. It may cause uncomfortable feeling or carsick of the occupant. When the object to be visually recognized is grasped by the occupant (for example, the occupant is reading), each of the longitudinal acceleration allowable value $C_{AX}$ and the vertical acceleration allowable value $C_{AZ}$ of the mobile object is changed to the suppression value S' smaller than the reference value S.

On the other hand, when the object to be visually recognized is not grasped by the occupant, that is, when the occupant is seeing a display or the like disposed in the mobile object, the mobile object motion allowable value C is changed according to the kind of the content to be viewed. For example, by separately preparing the suppression value S' for the time of viewing a moving image and the suppression value S' for the time of viewing a still image, the mobile object motion allowable value C at the time of viewing a slide show image is set smaller than that at the time of viewing news video.

In the case where the object to be visually recognized exists in the mobile object as illustrated in FIG. 19, the mobile object motion allowable value C is changed on the basis of the occupant direction $D_H$. Also when the object to be visually recognized and the occupant action are the same, the mobile object motion allowable value C in the case where the travel direction $D_C$ and the occupant direction $D_H$ are different is made smaller than that in the case where the travel direction $D_C$ and the occupant direction $D_H$ are the same. For example, as illustrated in FIG. 18, the longitudinal acceleration allowable value $C_{Ax}$ and the lateral acceleration allowable value $C_{Ay}$ as one of the mobile object motion allowable value C are set to the suppression values $S'_{Ax}$ and $S'_{Ay}$ smaller than the reference values $S_{Ax}$ to $S_{Ay}$ of the case where the travel direction $D_C$ and the occupant direction $D_H$ are the same.

Travel Control Computing Unit 1Ab

Figure 15:
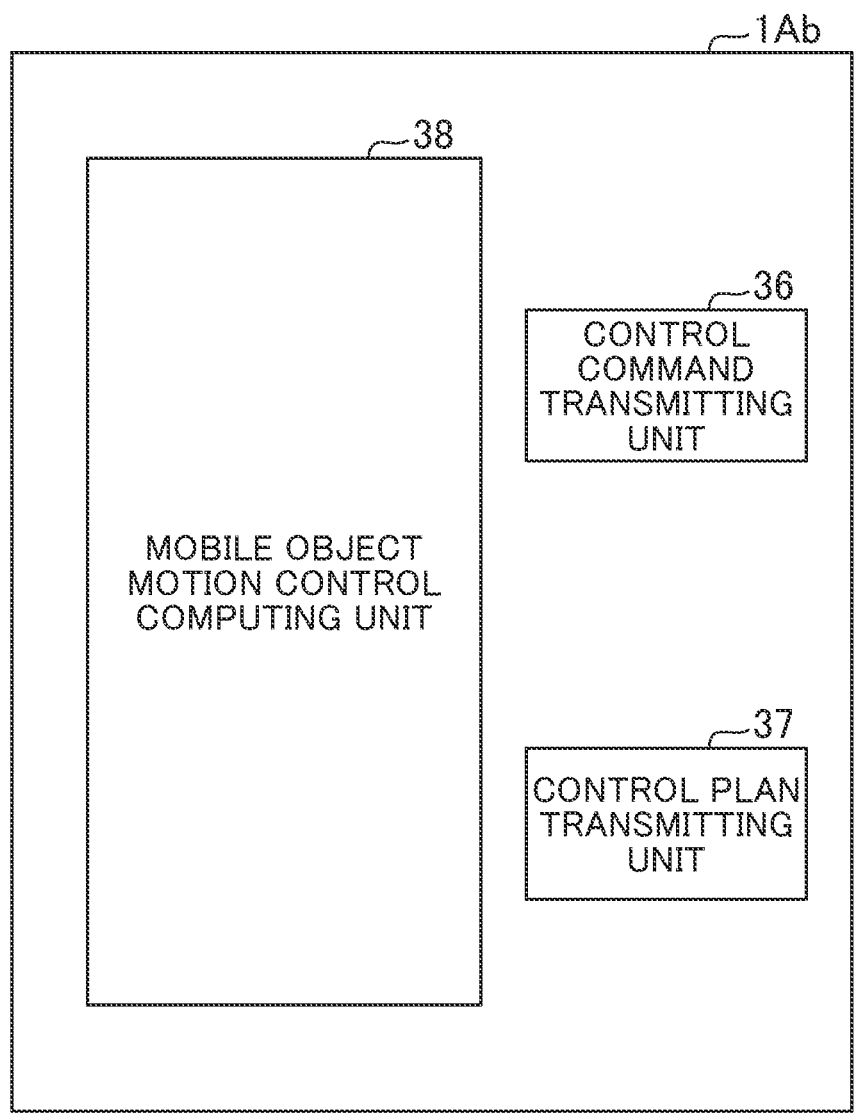
FIG. 15 is a diagram illustrating the configuration of a travel control computing unit of the mobile object motion control device in the embodiment of the mobile object control system according to the present invention.

FIG. 15 is a functional block diagram illustrating the internal configuration of the travel control computing unit 1Ab.

In the travel control computing unit 1Ab, the longitudinal acceleration of each of the mobile objects 21 is computed. The travel control computing unit 1Ab has a mobile object motion control computing unit 38, a control command transmitting unit 36, and a control plan transmitting unit 37.

In the mobile object motion control computing unit 38, based on various information such as target path, target velocity, and target clearance obtained by the mobile object motion control device 1A, a longitudinal acceleration command value for realizing the longitudinal acceleration control on the mobile object 21 by an actuator mounted in the mobile object 21 and a longitudinal acceleration control plan for a curved path of each of the mobile objects 21 are computed. The mobile object motion control computing unit 38 computes the longitudinal acceleration command value and the longitudinal acceleration control plan for each of the mobile objects 21 of a mobile object group forming a platoon system. The computation result of the longitudinal acceleration command value is transmitted to the control command transmitting unit 36, and the computation result of the longitudinal acceleration control plan is transmitted to the control plan transmitting unit 37.

In the case of controlling lateral acceleration in addition to longitudinal acceleration in the mobile object motion control device 1A, the mobile object motion control computing unit 38 computes a steering command value for travel on the target path in an actuator mounted in the mobile object 21 on the basis of the information obtained by the target path obtaining unit 31, the mobile object motion state obtaining unit 32, the platoon information obtaining unit 33, and the carried-object information obtaining unit 34, and transmits it to the control command transmitting unit 36. The steering command value is also computed for each of the mobile objects 21 of the mobile object group like the computation result of the longitudinal acceleration command and transmitted to the control command transmitting unit 36.

The control command transmitting unit 36 transmits, as a control command value, the longitudinal acceleration command value for each of the mobile objects 21 or both of the longitudinal acceleration command value generated by the mobile object motion control computing unit 38 and the steering command value to each of corresponding mobile objects 21 in the mobile object group. Based on the longitudinal acceleration command value or both of the longitudinal acceleration command value and the steering command value generated by the mobile object motion control computing unit 38, each of the mobile objects 21 transmits a control command value to each of the control units (the brake control unit 10, the drive torque control unit 12, and the steering control unit 15) driving and controlling the actuators (the brake actuator 11, the drive actuator 13, and the steering control actuator 16) capable of controlling the longitudinal acceleration and/or the actual steering angle of tires.

On the other hand, the control plan transmitting unit 37 transmits the longitudinal acceleration control plan generated by the mobile object motion control computing unit 38 to each of corresponding mobile objects 21.

Figure 20:
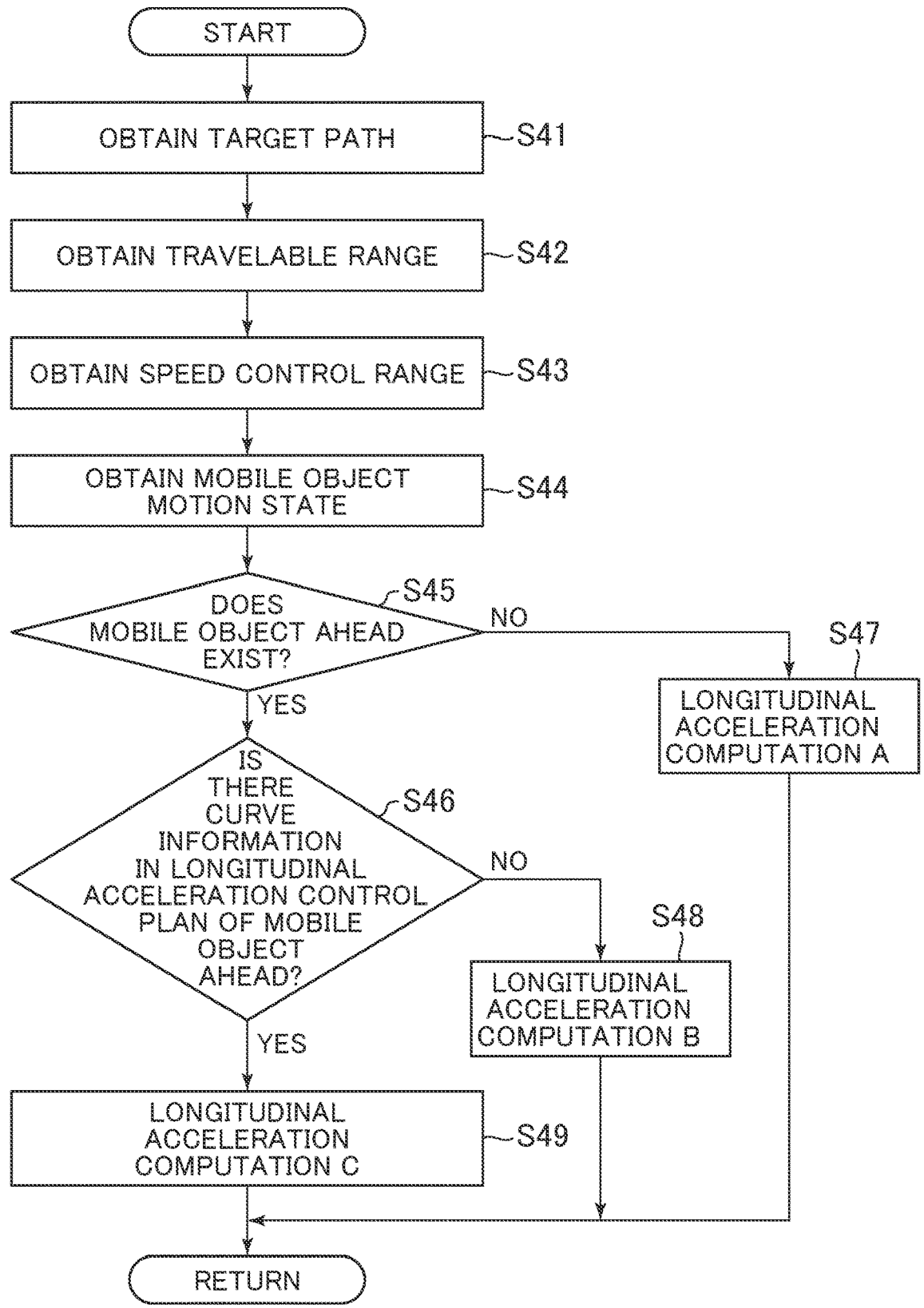
FIG. 20 is a flowchart of a first embodiment of the mobile object control system according to the present invention.

Next, referring to FIGS. 20 to 23, the mobile object motion control method in the embodiment will be described. FIG. 20 is a flowchart illustrating the content of processes in the mobile object control device 1A of the embodiment. Determination in the flowchart of FIG. 20 is made for each of a plurality of mobile objects 21 forming a platoon.

First, in S41 to S44, by (the target path obtaining unit 31, the mobile object motion state obtaining unit 32, the platoon information obtaining unit 33, and the carried-object information obtaining unit 34 of) the platoon control computing unit 1Aa, for the mobile object 21 as a computation target, information of the target path, travelable range, speed control range, mobile object motion state, preceding mobile object travel path, preceding mobile object speed, preceding mobile object longitudinal acceleration control plan, preceding mobile object clearance, following mobile object travel path, following mobile object speed, following mobile object longitudinal acceleration control plan, following mobile object clearance, (as necessary, maximum longitudinal acceleration, minimum longitudinal acceleration, or target clearance) and the like is obtained. The target path is converted to node point position data NPn (Xvn, Yvn) on the coordinates having the origin by using the mobile object gravity center position, the Xv axis using the direction of the mobile object speed vector as a positive, and the Yv axis orthogonal to the Xv axis. "n" is an integer which uses the point closest to a mobile object as 0 and increases like 1, 2, . . . , nmax toward the own-mobile-object travel direction. nmax is the maximum value of obtainable node point position data number "n". Yv$\theta$ as a Yv-axis component of NP$\theta$ is a lateral-direction deviation of a mobile object. It is assumed that each node point also has a travelable range and a vehicle speed control range at the node point position. As platoon information, for a mobile object which is at the platoon front end in platoon travel and does not have a preceding mobile object, information of "no preceding mobile object" is obtained as preceding mobile object information and, for a mobile object which is at the platoon tail end and does not have a following mobile object, information of "no following mobile object" is obtained as following mobile object information.

In S45, whether a mobile object 21 ahead of a mobile object 21 as a computation target exists or not is determined. Concretely, (the mobile object motion control computing unit 38 of) the mobile object motion control device 1A determines whether the mobile object 21 as a computation target has a preceding mobile object longitudinal acceleration control plan or not. In the case where the mobile object 21 as a computation target does not have the preceding mobile object longitudinal acceleration control plan (NO in S45), it is determined that the mobile object 21 as a computation target is the platoon foremost part, that is, the mobile object 21 at the head of the platoon, and the program advances to S47. In the case where the mobile object 21 as a computation target has the preceding mobile object longitudinal acceleration control plan (YES in S45), it is regarded as a following mobile object 21_$n$+1 travelling so as to follow the preceding mobile object 21_$n$, and the program advances to S46.

In S47, (the mobile object motion control computing unit 38 of) the mobile object motion control device 1A computes the longitudinal acceleration of the platoon foremost part, that is, the mobile object 21_1 at the head of the platoon (the mobile object 0 in FIG. 1) (longitudinal acceleration computation A). In the longitudinal acceleration computation A, from the target path, the travelable range, the vehicle speed control range, and the mobile object motion state, the longitudinal acceleration command value and the longitudinal acceleration control plan of the mobile object 21_1 in the platoon foremost part are computed. For example, when the mobile object speed of the mobile object 21_1 in the platoon foremost part is high and exceeds the vehicle speed control range, (the mobile object motion control computing unit 38 of) the mobile object motion control device 1A computes a negative longitudinal acceleration command value so that the mobile object speed lies within the vehicle speed control range. In the case where the target path has a curved-road shape (a shape in which the absolute value of the road curvature of the travel load ($\approx$ curvature of the travel path) increases to a maximum value or almost constant, or a shape in which the absolute value of the road curvature of the travel road ($\approx$ curvature of the travel path) decreases from the maximum value or almost constant value) and the acceleration/deceleration control according to the curved road is performed, a longitudinal acceleration command value based on the curved-road shape is computed. For example, (the mobile object motion control computing unit 38 of) the mobile object motion control device 1A generates a negative longitudinal acceleration (decelerates) in an interval that the absolute value of the road curvature of the travel road ($\approx$ curvature of the travel path) increases and the absolute value of the lateral acceleration generated in the mobile object 21_1 increases, and controls the longitudinal acceleration value so that the longitudinal acceleration generated decreases the larger the time change in the lateral acceleration is (refer to FIG. 7($a$) and FIG. 10($a$)). In addition, (the mobile object motion control computing unit 38 of) the mobile object motion control device 1A generates a positive longitudinal acceleration (accelerates) in an interval that the absolute value of the road curvature of the travel road ($\approx$ curvature of the travel path) decreases and the absolute value of the lateral acceleration generated in the mobile object 21_1 decreases, and controls the longitudinal acceleration value so that the longitudinal acceleration generated increases the larger the time change in the lateral acceleration is (refer to FIG. 8($a$) and FIG. 10($a$)). After computation of the longitudinal acceleration command value, it is transmitted as a control command value to the mobile object 21_1.

Figure 21:
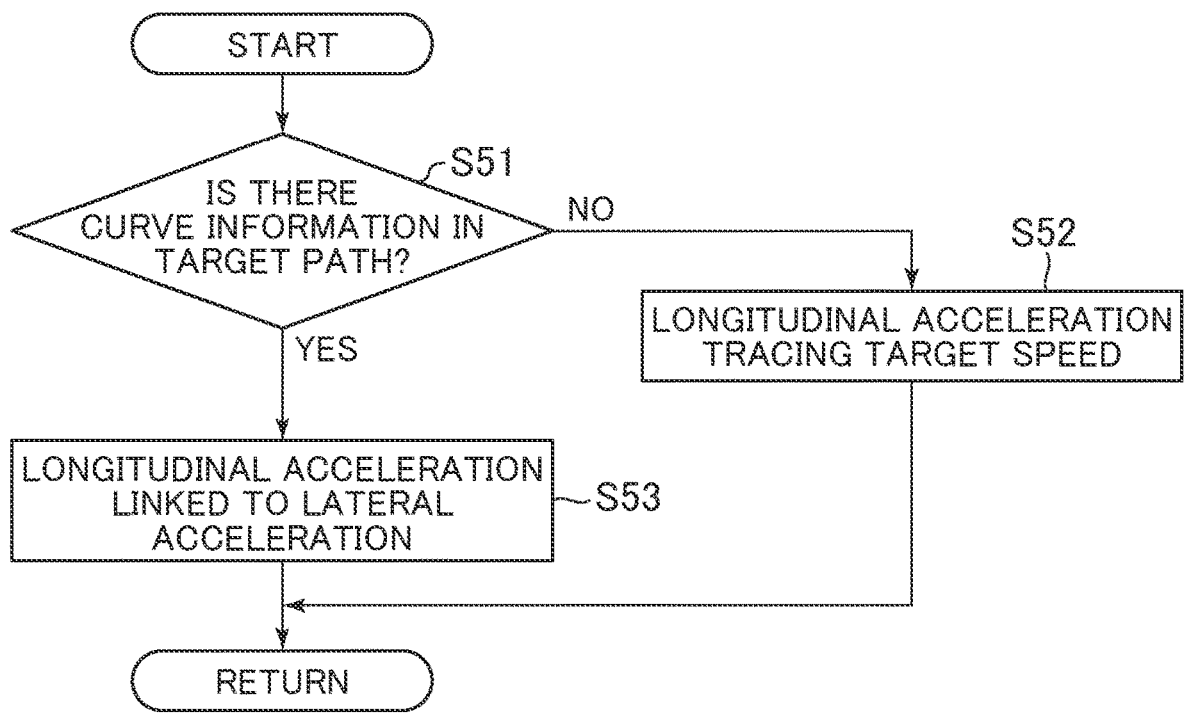
FIG. 21 is a flowchart for explaining a method of computing longitudinal acceleration of a head mobile object of a platoon.

FIG. 21 is a flowchart for explaining the content of the longitudinal acceleration computation A of S47.

In the longitudinal acceleration computation A, whether or not there is curve information in the target path which is set in the mobile object 21_1, that is, whether there is curve information in the longitudinal acceleration control plan of the mobile object 21_1 at the head of the platoon or not is determined. When there is no curve information (NO in S51), that is, in the case of a straight road, the longitudinal acceleration following the target speed is computed (S52). On the other hand, in the case where there is curve information (YES in S51), that is, in the case of a curved road, to perform the longitudinal acceleration control which generates a longitudinal motion coordinated with the lateral motion, the longitudinal acceleration coordinated with the lateral jerk is computed (S53). Therefore, in the case where an object carried by the mobile object 21_*n* is an occupant, the ride comfort at the time of travel on a curve is improved. When the carried object is cargo, cargo shifting can be prevented.

In S46, (the mobile object motion control computing unit 38 of) the mobile object motion control device 1A determines whether or not there is curve information in the longitudinal acceleration control plan of the preceding mobile object 21_*n*, that is, whether or not the preceding mobile object 21_*n* traveling ahead of the mobile object 21_*n*+1 as a computation target has the longitudinal acceleration control plan for a curved road. The longitudinal acceleration control plan obtained here may be a plan made by a longitudinal acceleration profile from present time to predetermined future time and a longitudinal acceleration control plan flag referred from a curved road, which is attached to the longitudinal acceleration profile, or a plan made by adding profile information which is set by being referred from a curve road to node point position information and a speed profile at each node point position or a longitudinal acceleration profile. Any method may be employed as long as a longitudinal acceleration control plan for a curved road of the preceding mobile object 21_*n* is known. When there is no curve information in the longitudinal acceleration control plan of the preceding mobile object 21_*n*, to compute the longitudinal acceleration when the mobile object 21_*n* as a computation target travels on a straight road, the program advances to S48. In the case where there is curve information, to compute the longitudinal acceleration when the mobile object 21_*n* as a computation target travels on a curved road, the program advances to S49.

In S48, (the mobile object motion control computing unit 38 of) the mobile object motion control device 1A computes, as a longitudinal acceleration computation B, the longitudinal acceleration command value and the longitudinal acceleration control plan of the mobile object 21_*n*+1 as a computation target on the basis of the longitudinal acceleration control plan of the preceding mobile object 21_*n* (the longitudinal acceleration computation B). Concretely, in order to maintain the clearance between the mobile object 21_*n*+1 as a computation target and the preceding mobile object 21_*n*, (the mobile object motion control computing unit 38 of) the mobile object motion control device 1A computes a longitudinal acceleration command value and a longitudinal acceleration control plan by which the velocity relative to the preceding mobile object 21_*n* becomes zero or a longitudinal acceleration command value and a longitudinal acceleration control plan by which the clearance between the mobile object 21_*n*+1 and the preceding mobile object 21_*n* becomes target clearance. The target clearance may be a preliminarily set value or a value obtained from the outside by communication means. The target clearance may be changed according to the maximum longitudinal acceleration and/or the minimum longitudinal acceleration which can be generated in each of the mobile objects 21 in platoon travel. After computation of the longitudinal acceleration command value, it is transmitted as a control command value from the mobile object motion control device 1A to the mobile object 21_*n*+1 as a computation target.

Figure 22:
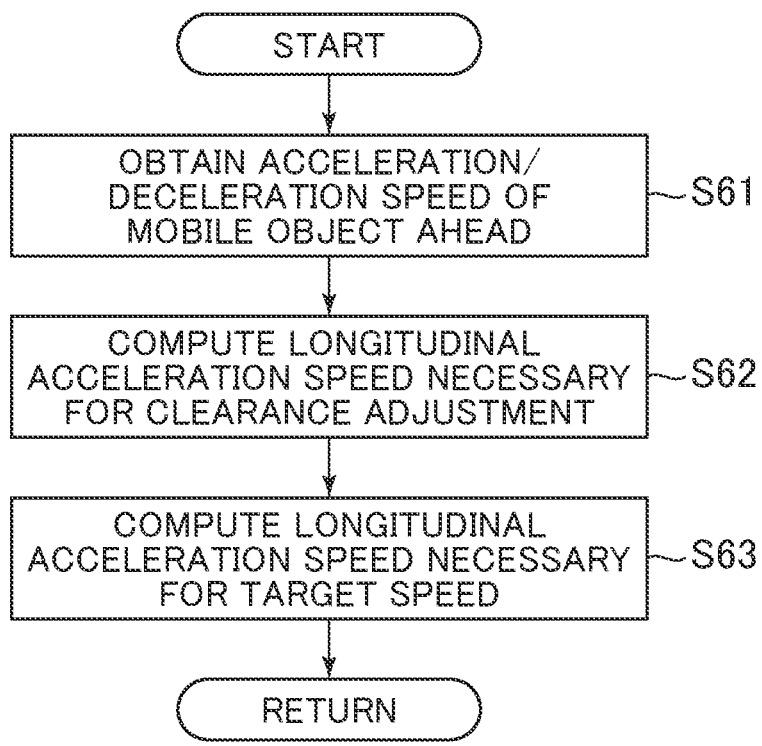
FIG. 22 is a flowchart for explaining a method of computing longitudinal acceleration of a tracking mobile object in the case where there is no curve information in a longitudinal acceleration control plan of a preceding mobile object.

FIG. 22 is a flowchart for explaining the content of the longitudinal acceleration computation B in S48.

In the longitudinal acceleration computation B, the longitudinal acceleration of the mobile object 21_*n*+1 as a computation target having the preceding mobile object 21_*n* is computed. Since there is no curve information in the target path of the mobile object 21_*n*+1 as a computation target (NO in S46), that is, there is no curve information in the longitudinal acceleration control plan of the mobile object 21_*n*+1 as a computation target, and it is a plan of travelling on a straight line, the acceleration/deceleration of the preceding mobile object 21_*n* is obtained (S61). The longitudinal acceleration computation necessary to adjust the clearance between the preceding mobile object 21_*n* and the mobile object 21_*n*+1 as a computation target is performed (S62). The longitudinal acceleration computation necessary for the target speed is performed for the mobile object 21_*n*+1 as a computation target (S63).

In S49, (the mobile object motion control computing unit 38 of) the mobile object motion control device 1A computes, as the longitudinal acceleration computation C, the longitudinal acceleration command value and the longitudinal acceleration control plan of the mobile object 21_*n*+1 as a computation target on the basis of the longitudinal acceleration control plan and the curve information in the mobile object travel direction of the preceding mobile object 21_*n* (longitudinal acceleration computation C). Concretely, (the mobile object motion control computing unit 38 of) the mobile object motion control device 1A computes a longitudinal acceleration command value and a longitudinal acceleration control plan added with a longitudinal acceleration control flag due to a curved road so that the clearance distance decreases and becomes a target clearance in a region that, as described above, before the curvature of the travel path of the preceding mobile object 21_*n* increases and the absolute value of the lateral acceleration generated in the preceding mobile object 21_*n* increases/decreases, the clearance between the mobile object 21_*n*+1 as a computation target and the preceding mobile object 21_*n* increases, the curvature of the travel path of the mobile object 21_*n*+1 as a computation target and the preceding mobile object 21_*n* becomes almost constant, and the lateral acceleration of the mobile object 21_*n*+1 as a computation target and the preceding mobile object 21_*n* becomes almost constant. After computing the longitudinal acceleration command value, it is transmitted as the control command value from a server 100 to the mobile object 21_*n*+1 as a computation target.

Figure 23:
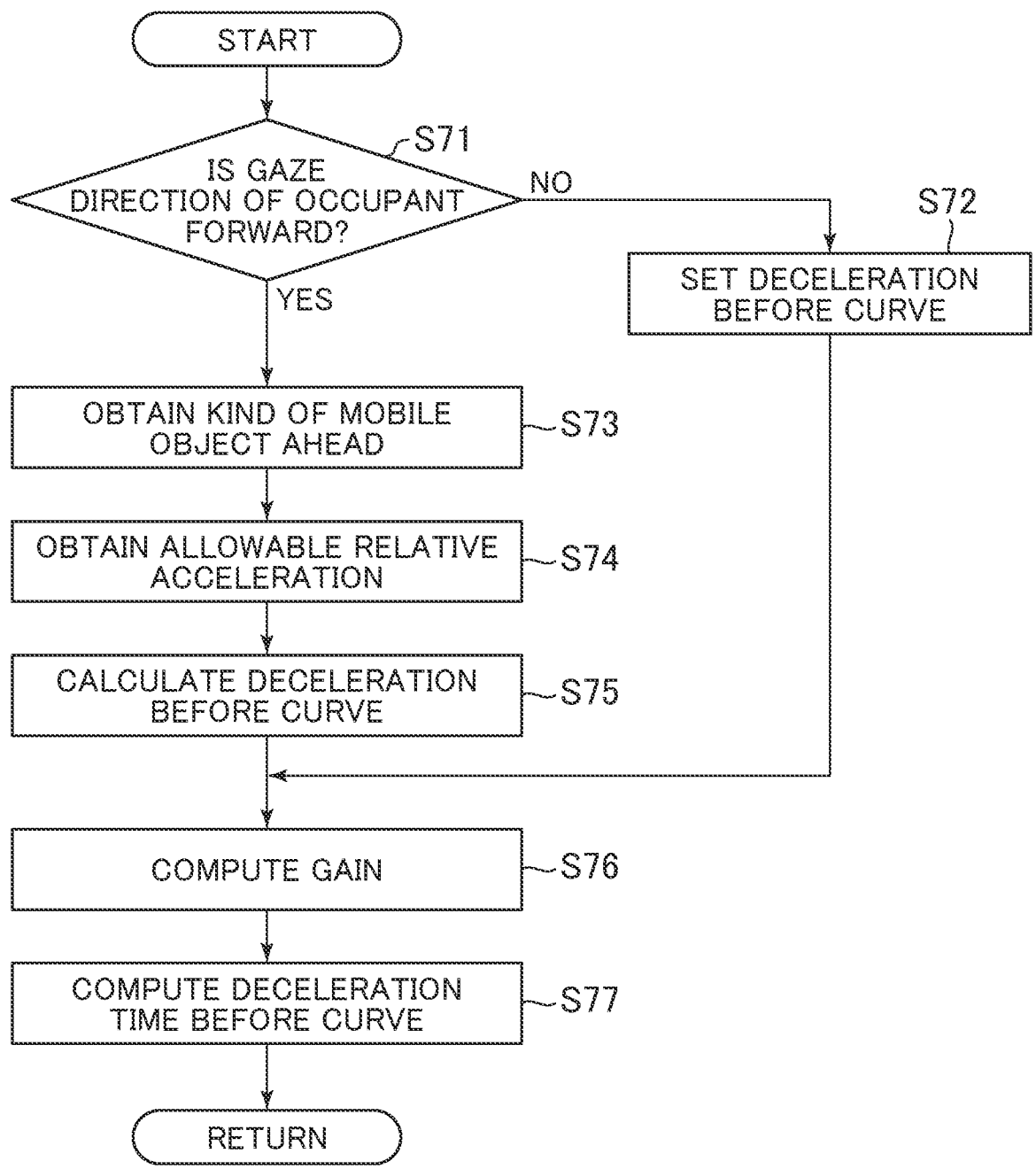
FIG. 23 is a flowchart for explaining a method of computing longitudinal acceleration of a tracking mobile object in the case where there is curve information in a longitudinal acceleration control plan of the preceding mobile object.
Figure 24:
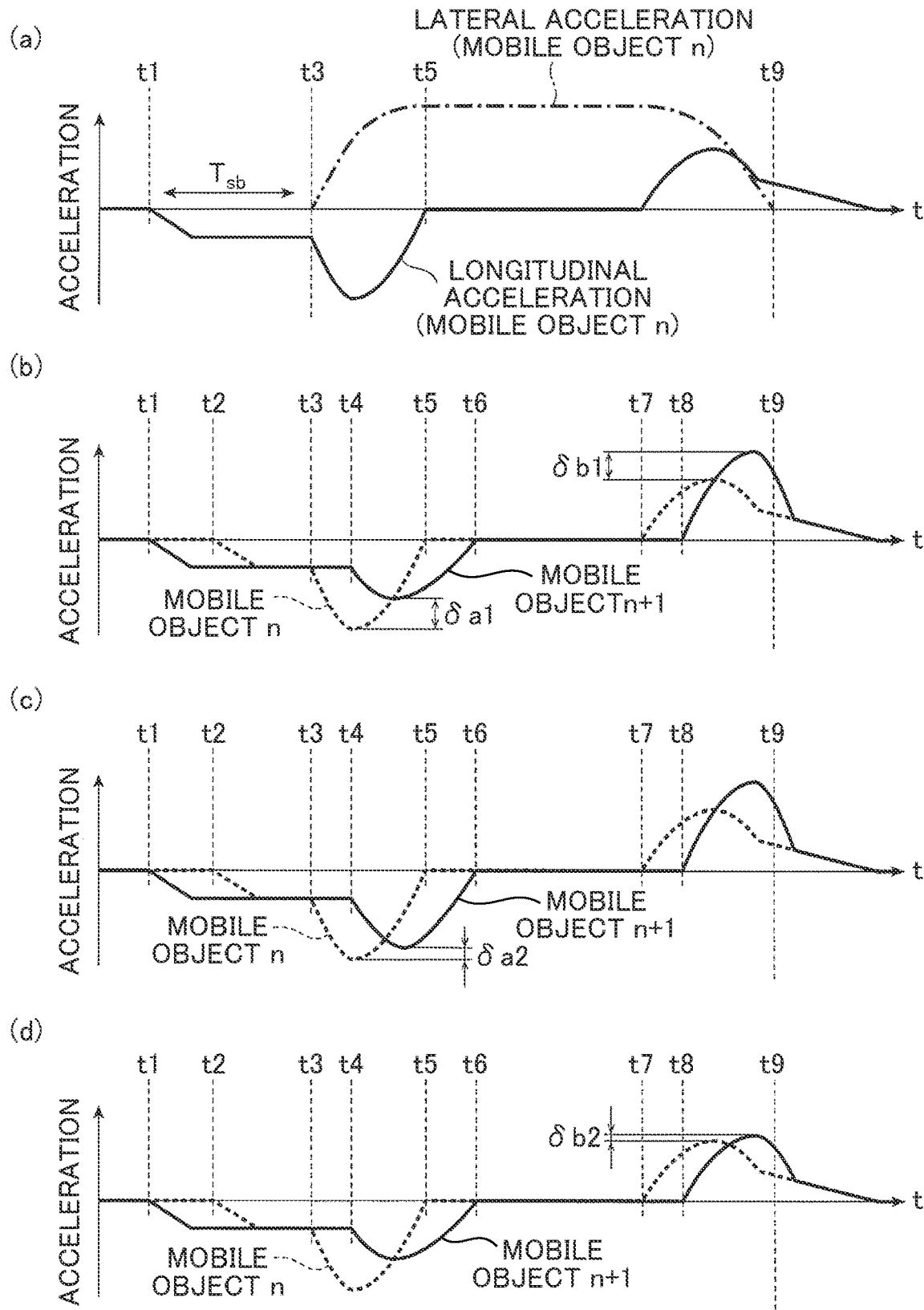
FIGS. 24(a), 24(b), 24(c) and 24(d) are diagrams illustrating changes in the longitudinal acceleration acting on a mobile object at the time of travel on a curved road.
Figure 25:
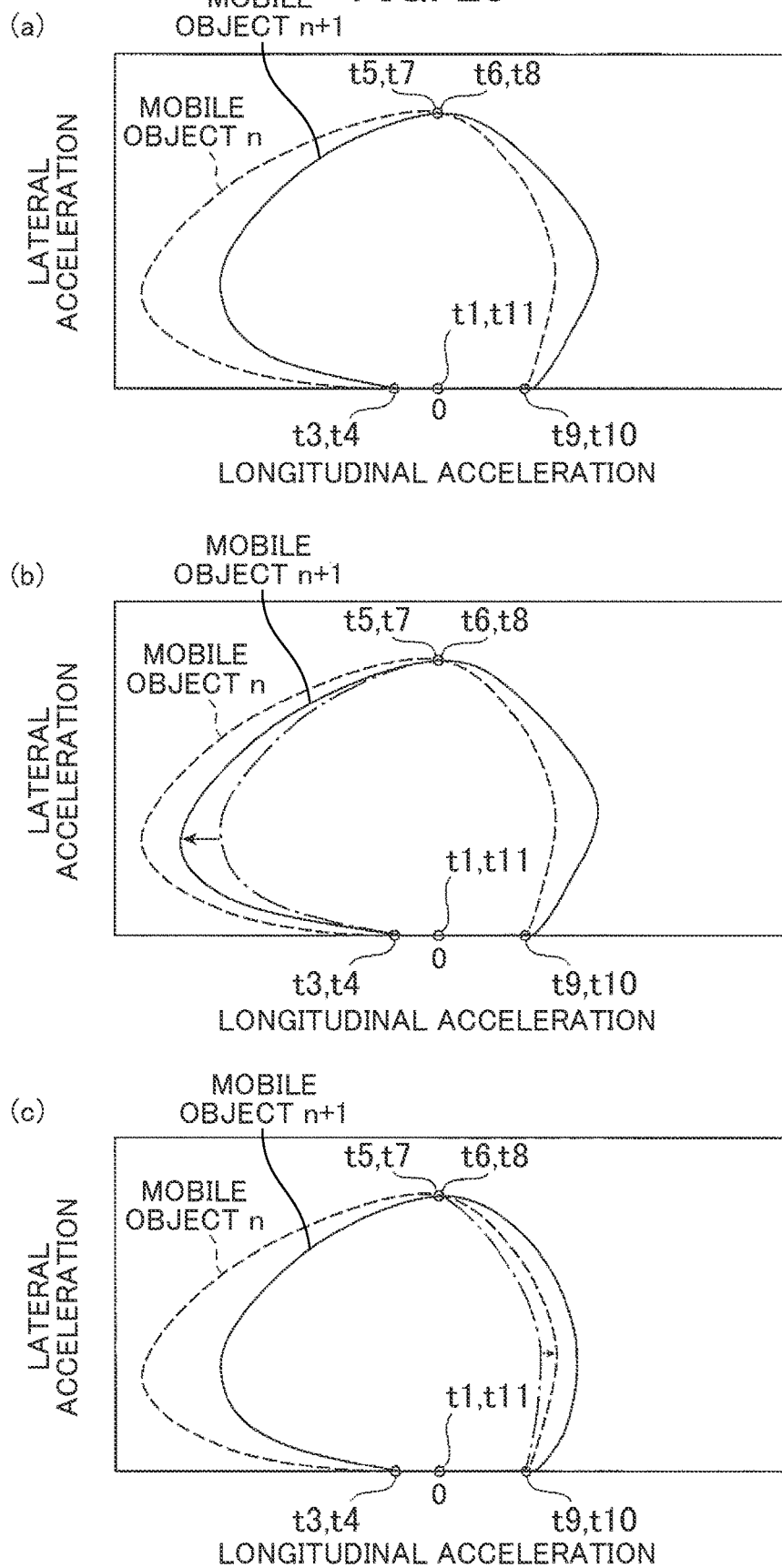
FIGS. 25(a), 25(b), and 25(c) are "g-g" diagrams illustrating the relation between the longitudinal acceleration and the lateral acceleration when the longitudinal acceleration control in the embodiment is applied.

FIG. 23 is a flowchart for explaining an example of the content of the longitudinal acceleration computation C in S49. Referring to FIG. 23, the case where a carried-object of the mobile object 21_*n*+1 as a computation target is an occupant will be described.

In the longitudinal acceleration computation C, first, whether the gaze direction of the occupant is forward or not is determined (S71).

In the case where the gaze direction of the occupant riding on the mobile object 21_*n*+1 as a computation target is not forward (NO in S71), even when the deceleration of the preceding mobile object 21_*n* at the time of entry of a curve is larger than that of the mobile object 21_n+1 as a computation target, if the deceleration is within a normal range, it is no fear that anxiety or oppressing feeling is given to the occupant of the mobile object 21_n+1 as a computation target. Therefore, in such a case, normal before-curve deceleration in which both ride comfort and transport efficiency are considered is set (S72). For example, as the before-curve deceleration, as illustrated in FIG. 7(a), a predetermined value is calculated. The before-curve deceleration is deceleration to make the mobile object 21_n+1 as a computation target decelerate in advance before the preceding mobile object 21_n enters the curve and is longitudinal acceleration which is not coordinated with the jerk. The mobile object 21_n+1 as a computation target starts deceleration at the before-curve deceleration and performs the longitudinal acceleration control so that the longitudinal acceleration at time when the deceleration starts becomes smaller than the longitudinal acceleration generated in the preceding mobile object 21_n at the same time, that is, the deceleration generated in the mobile object 21_n+1 as a computation target becomes larger than the deceleration generated in the preceding mobile object 21_n at the same time. The before-curve deceleration is also adjusted depending on whether the gaze direction of the occupant is forward or not.

On the other hand, in the case where the gaze direction of the occupant is forward (YES in S71), the program moves to the process in S73 and subsequent processes so that the occupant of the mobile object 21_n+1 as a computation target does not feel anxiety or oppression by the motion of the preceding mobile object 21_n.

First, information of the kind of the mobile object 21_n is obtained (S73). For example, in the case where the preceding mobile object 21_n is a large-sized mobile object such as a dump truck or bus, the anxiety feeling or oppressing feeling of the occupant of the following mobile object 21_n+1 becomes larger as compared with the case of a small-sized mobile object such as a car. Therefore, in the case where the preceding mobile object 21_n is a large-sized mobile object, it is desirable to perform the longitudinal acceleration control of increasing the before-curve deceleration of the following mobile object 21_n+1 as a computation target as compared with the case of a small-sized mobile object. For this reason, the information of the kind of the preceding mobile object 21_n−1 is obtained.

Subsequently, a process of obtaining allowable relative acceleration of the mobile object 21_n+1 as a computation target to the preceding mobile object 21_n is performed (S74). For example, when the deceleration of the preceding mobile object 21_n is larger than that of the mobile object 21_n+1 as a computation target and the difference between the decelerations is equal to or larger than a predetermined value, the occupant of the following mobile object 21_n+1 feels that the preceding mobile object 21_n approaches rapidly, and it is feared that the occupant will get anxiety feeling or oppressing feeling. Therefore, the difference of the deceleration from the preceding mobile object 21_n has to lie within a range of a certain degree. The allowable relative acceleration by which the occupant can prevent from getting the anxiety feeling or oppressing feeling is obtained. The allowable relative acceleration may be a fixed value or may be varied according to the kind obtained in S73.

The before-curve deceleration according to the case where the gaze direction of the occupant of the mobile object 21_n+1 is forward is calculated (S75). In S75, the before-curve deceleration is calculated on the basis of the information obtained in S73 and S74, that is, the kind of the preceding mobile object 21_n and the allowable relative acceleration.

The before-curve deceleration is set to a small value so that deceleration is performed more gently as compared with the before-curve deceleration (S72) calculated in the case where the gaze direction of the occupant is not forward.

To perform the longitudinal acceleration control which generates a longitudinal motion coordinated with a lateral motion, the longitudinal acceleration coordinated with the lateral jerk is computed. In this case, a process of computing gain K for calculating the longitudinal acceleration from the lateral jerk is performed (S76). The longitudinal acceleration is obtained by the following arithmetic expression (1).

$$Gx = K\dot{G}y \qquad (1)$$

(where Gx: longitudinal acceleration, Gy: lateral jerk, K: gain)

In the case where the gaze direction of the occupant of the mobile object 21_n+1 is not forward (NO in S71), the occupant does not see the preceding mobile object 21_n. Consequently, even when the mobile object 21_n+1 as a computation target decreases the speed at the before-curve deceleration, the anxiety feeling or oppressing feeling is not given to the occupant of the mobile object 21_n+1. Therefore, in S76, the value of the gain K which places priority on the transport efficiency over the ride comfort of the occupant is set.

On the other hand, in the case where the gaze direction of the occupant of the mobile object 21_n+1 is forward (YES in S71), when the mobile object 21_n+1 as a computation target decreases the speed at normal deceleration and approaches the preceding mobile object 21_n, it is feared that the occupant of the mobile object 21_n+1 feels anxiety or oppression. Therefore, in S76, for a period until a steady turn is obtained from the entrance of a curve, the value of the gain K by which the clearance with the preceding mobile object 21_n is gently increased/decreased is set.

In the case where the gaze direction of the occupant of the mobile object 21_n+1 is forward (YES in S71), the gain K is computed by using the information of the kind of the preceding mobile object obtained in S73, the information of the allowable relative acceleration obtained in S74, and the value of the before-curve deceleration calculated in S75. On the other hand, in the case where the gaze direction of the occupant of the mobile object 21_n+1 is not forward (NO in S71), the gain K is computed by using the value of the before-curve deceleration obtained in S72.

In the computation of the gain K in S76, when it is determined that the gaze direction of the occupant of the mobile object 21_n+1 as a computation target is forward in S71, the value larger than the gain K at the time of solo travel or travel at the head is computed as the gain K at the entrance of a curve as compared with the case where it is determined that the gaze direction is not forward.

After that, before-curve deceleration time Tsb is computed with respect to the mobile object 21_n+1 as a computation target (S77). The before-curve deceleration time Tsb is time of generating the longitudinal acceleration which is not coordinated with the lateral jerk before entry of a curve, that is, before-curve deceleration, and is computed based on the value of the before-curve deceleration calculated in S72 or S75.

In the above-described longitudinal acceleration computation C, the case of the mobile object 21_n+1 as a computation target and the preceding mobile object 21_n has been described as an example. The present invention can be also similarly applied to the case of the mobile object 21_n+1 as a computation target and the following mobile object 21_n+2. Specifically, in the case where the gaze direction of the occupant riding on the mobile object 21_n+1 as a computation target is rearward, when the following mobile object 21_n+2 approaches the mobile object 21_n+1 as a computation target at rapid speed at the time of passing a curve, it is feared that the occupant feels anxiety or oppression. Consequently, in computation of the before-curve deceleration of the following mobile object 21_n+2 and the gain K, when it is determined that the gaze direction of the occupant of the mobile object 21_n+1 as a computation target is rearward, the before-curve deceleration and the gain K are set to large values as compared with the case where it is determined that the gaze direction is not rearward.

FIGS. 24(a), 24(b), 24(c) and 24(d) are diagrams illustrating changes in the longitudinal acceleration acting on a mobile object at the time of travel on a curved road. FIG. 24(a) illustrates changes in the longitudinal acceleration and the lateral acceleration when a mobile object travels alone. FIGS. 24(b) to 24(d) are diagrams illustrating changes in the acceleration of two mobile objects which travel in a platoon. FIG. 24(b) illustrates changes in the longitudinal acceleration when no occupant rides on the mobile object 21_n+1 as a computation target, FIG. 24(c) illustrates changes in the longitudinal acceleration when the occupant of the mobile object 21_n+1 sees forward, and FIG. 24(d) is a diagram illustrating changes in the longitudinal acceleration when the occupant of the preceding mobile object 21_n sees rearward. FIGS. 25(a), 25(b), and 25(c) are "g-g" diagrams illustrating the relation between the longitudinal acceleration and the lateral acceleration when the longitudinal acceleration control in the embodiment is applied. FIG. 25(a) is a "g-g" diagram in the case where no occupant rides in the mobile object 21_n+1, FIG. 25(b) is a "g-g" diagram in the case where the occupant of the mobile object 21_n+1 sees forward, and FIG. 25(c) is a "g-g" diagram in the case where the occupant of the preceding mobile object 21_n sees rearward.

In FIG. 24(a), time t3 is time when the mobile object 21_n passes through a curve entrance, time t1 is time which is earlier than the time t3 only by the before-curve deceleration time Tsb, time t5 is time when the lateral acceleration becomes constant in the curved road, and time t9 is time of passage through the curve exit. When the mobile object 21_n travels alone on a curved road, vehicle control is performed so that the longitudinal acceleration is generated at the time t1 which is earlier than the time t3 of passage through the curve entrance only by the before-curve deceleration time Tsb by a control command value from the mobile object motion control device 1A. The longitudinal acceleration in the before-curve deceleration time Tsb is longitudinal acceleration which is not coordinated with the lateral acceleration. For the period of time since the time t3 of passage through the curve entrance to the time t5 when the lateral acceleration becomes constant, the longitudinal acceleration control of generating the longitudinal motion coordinated with the lateral motion is performed.

In each of FIGS. 24(b) to 24(d), the solid line indicates changes in the acceleration of the mobile object 21_n+1 as a computation target, and the broken line indicates changes in the acceleration of the preceding mobile object 21_n. Time t4 is time when the mobile object 21_n+1 passes through the curve entrance, time t1 is time which is earlier than the time t4 only by the before-curve deceleration time Tsb, time t6 is time when the lateral acceleration becomes constant in the curved road, time t8 is time when the lateral acceleration starts decreasing, and time t9 is time of passage through the curve exit. Time t3 is time when the preceding mobile object 21_n passes through the curve entrance, time t2 is time when the before-curve deceleration starts, time t5 is time when the lateral acceleration becomes constant in the curved road, and time t9 is time when the lateral acceleration becomes zero. FIGS. 24(b) to 24(d) correspond to FIGS. 25(a) to 25(c), respectively.

First, as illustrated in FIG. 24(b), when no occupant rides on the mobile object 21_n+1, the longitudinal acceleration control which generates the longitudinal motion coordinated with the lateral motion described with reference to FIGS. 6 to 11 is performed for the mobile object 21_n+1. In the mobile object 21_n+1, deceleration starts at the timing t1 before the curve entrance, and the speed is decreased at the longitudinal acceleration which is not coordinated with the lateral acceleration until the time t4 when the mobile object 21_n+1 reaches the curve entrance (the before-curve deceleration time Tsb).

After passage through the curve entrance, the mobile object 21_n+1 is controlled at the longitudinal acceleration lower than that of the preceding mobile object 21_n by the longitudinal acceleration control according to the lateral acceleration. In the example illustrated in FIG. 24(b), the difference between the longitudinal acceleration of the preceding mobile object 21_n and that of the following mobile object 21_n+1 is Sa1 at maximum.

At the time t8 behind the time t7 when the lateral acceleration of the preceding mobile object 21_n starts decreasing toward the curve exit, the longitudinal acceleration control is performed so that the motion becomes the longitudinal motion coordinated with the lateral motion of the following mobile object 21_n+1. In the control of the longitudinal acceleration according to the lateral acceleration at the curve exit, the following mobile object 21_n+1 is controlled to the longitudinal acceleration lower than that of the preceding mobile object 21_n. In the example illustrated in FIG. 24(b), the difference between the longitudinal acceleration of the preceding mobile object 21_n and that of the following mobile object 21_n+1 is δb1 at maximum. In the example illustrated in FIG. 24(b), since no occupant rides in the following mobile object 21_n+1, the longitudinal acceleration according to the lateral acceleration is set to a normal value realizing both ride comfort and transport efficiency.

As illustrated in FIG. 24(c), when the occupant in the following mobile object 21_n+1 sees forward, the longitudinal acceleration is controlled so that the longitudinal acceleration at the curve entrance becomes smaller (the deceleration becomes larger) as compared with the case where no occupant rides as illustrated in FIG. 24(b). In the example illustrated in FIG. 24(c), the difference between the longitudinal acceleration of the preceding mobile object 21_n and that of the following mobile object 21_n+1 is δa2 at maximum (δa1>δ2a). In the case where the occupant of the following mobile object 21_n+1 sees forward, as illustrated in FIG. 7(b), the clearance with the preceding mobile object 21_n can be changed gently for a period since time before entry of the curve until the steady turn. Therefore, the clearance is not shortened rapidly, so that the feeling of anxiety or the feeling of oppression can be prevented from being given to the occupant of the following mobile object 21_n who grazes forward, and the ride comfort can be improved.

Subsequently, when the occupant in the preceding mobile object 21_n sees rearward as illustrated in FIG. 24(d), the longitudinal acceleration is controlled so that the longitudinal acceleration at the curve exit becomes smaller (deceleration becomes larger) as compared with the case where no occupant rides as illustrated in FIG. 24(b). In the example illustrated in FIG. 24(d), the difference between the longitudinal acceleration of the preceding mobile object 21_n and that of the following mobile object 21_n+1 is δb2 at maximum (δb1>δb2). When the occupant of the preceding mobile object 21_n gazes rearward, in the following mobile object 21_n+1, the longitudinal acceleration is controlled so that the deceleration increases before the curve exit, the following mobile object 21_n+1 becomes apart from the preceding mobile object 21_n once, passes through the curve exit, and, after that, approaches the preceding mobile object 21_n again, and the clearance becomes the target clearance. Therefore, the occupant of the preceding mobile object 21_n can be prevented from feeling anxiety or oppression, and the ride comfort can be improved.

FIGS. 25(a), 25(b), and 25(c) are "g-g" diagrams illustrating the relation between the longitudinal acceleration and the lateral acceleration when the longitudinal acceleration control in the embodiment is applied. FIG. 25(a) is a "g-g" diagram in the case where no occupant rides in the following mobile object 21_n+1, FIG. 25(b) is a "g-g" diagram in the case where the occupant of the following mobile object 21_n+1 sees forward, and FIG. 25(c) is a "g-g" diagram in the case where the occupant of the preceding mobile object 21_n sees rearward.

As compared with the case where the occupant of the following mobile object 21_n+1 does not see forward as illustrated in FIG. 25(a), the degree of change in the longitudinal acceleration in response to the increase in the lateral acceleration of the following mobile object 21_n+1 becomes larger in the case where the occupant of the following mobile object 21_n+1 sees forward as illustrated in FIG. 25(b). That is, in the case where the occupant of the following mobile object 21_n+1 sees forward, the deceleration in the period since the curve entrance of the following mobile object 21_n+1 to the stationary turn (t4→t6) is changed so as to be large. In such a case, therefore, the following mobile object 21_n+1 slowly approaches the preceding mobile object 21_n (refer to FIG. 7(b)), and the occupant of the following mobile object 21_n+1 can be prevented from feeling anxiety or oppression due to rapid approach of the preceding mobile object 21_n.

In the case where the occupant of the preceding mobile object 21_n sees rearward as illustrated in FIG. 25(c), the degree of the change in the longitudinal acceleration in response to the decrease in the lateral acceleration of the preceding mobile object 21_n becomes larger. That is, in the case where the occupant of the preceding mobile object 21_n sees rearward, the deceleration in the period since the lateral acceleration of the preceding mobile object 21_n starts decreasing until the preceding mobile objects 21_n reaches the curve exit (t8→t9) is changed so that acceleration increases. Therefore, in such a case, the following mobile object 21_n+1 slowly approaches the preceding mobile object 21_n, movement like tailgating of the following mobile object 21_n+1 can be prevented, and the occupant of the preceding mobile object 21_n can be prevented from feeling anxiety or oppression.

Figure 26:
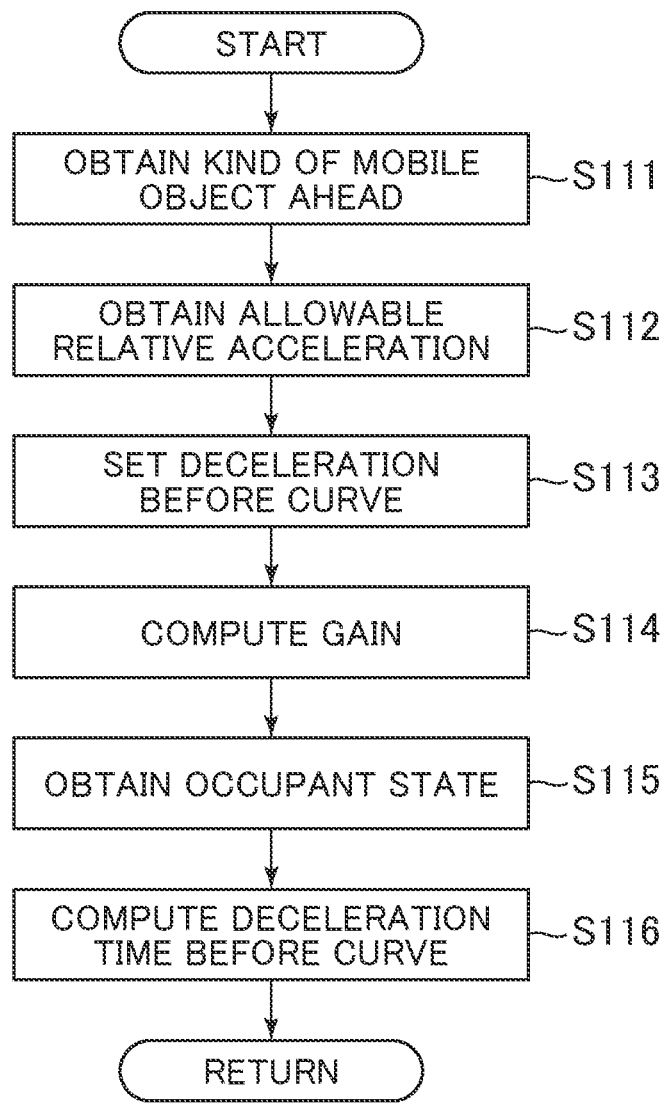
FIG. 26 is a flowchart for explaining the content of the longitudinal acceleration control in the embodiment.

FIG. 26 is a flowchart for explaining another example of the content of the longitudinal acceleration computation C of S49 (longitudinal acceleration computing unit).

Although the case of changing the gain K for calculating the longitudinal acceleration coordinated with the lateral jerk in accordance with the gaze direction of the occupant has been described in the foregoing embodiment, the before-curve deceleration time may be also changed in place of the gain K or together with the gain K. For example, in the case where the gaze direction of the occupant of the following mobile object 21_n+1 is forward, the longitudinal acceleration control may be performed so as to make the before-curve deceleration time longer as compared with the case where the gaze direction is not forward.

In this modification, first, information of the kind of the preceding mobile object 21_n is obtained (S111). Next, a process of obtaining the allowable relative acceleration of the following mobile object 21_n+1 with respect to the preceding mobile object 21_n is performed (S112). The processes until here are the same as the processes in S73 and S74 in FIG. 23.

Subsequently, before-curve deceleration for the following mobile object 21_n+1 is set (S113).

For the following mobile object 21_n+1, the gain K for controlling the longitudinal acceleration coordinated with the lateral jerk is computed (S114).

Then, a process of obtaining the state of the occupant of the following mobile object 21_n+1 is performed (S115). For example, the line of sight of the occupant is detected or estimated on the basis of information of the inside of the mobile object obtained from the in-vehicle sensor and used as the state of the occupant.

Using the information of the state of the occupant, a process of computing the before-curve deceleration time Tsb for decreasing the speed of the following mobile object 21_n+1 before entry of a curve is performed (S116). The before-curve deceleration time Tsb is adjusted according to the state of the occupant. For example, in the case where the occupant of the following mobile object 21_n+1 grazes forward, a longer value as compared with the case that the occupant does not graze forward is computed. Consequently, the longitudinal acceleration of the following mobile object 21_n+1 or the longitudinal acceleration of both of the preceding mobile object 21_n and the following mobile object 21_n+1 is controlled so that the clearance dn+1 between the preceding mobile object 21_n and the following mobile object 21_n+1 as a computation target increases before the absolute value of the lateral acceleration of the following mobile object 21_n+1 or the curvature of the travel path increases.

According to the modification, since the entry of a curve is made in a state where the clearance with the preceding mobile object 21_n is long, even the preceding mobile object 21_n comes closer to the following mobile object 21_n+1 during a turn, the occupant can be prevented from feeling anxiety or scary.

Although the case that the graze direction of the occupant is used as the state of the carried object has been described as an example in the foregoing embodiment, the present invention is not limited to the case. For example, when a carried object requires careful and gentle handling such as precision machines and perishable food, the longitudinal acceleration has to be controlled so that an impact is not applied to the carried object during carriage by the mobile object 21 or no cargo shifting occurs.

According to the embodiment, by computing the longitudinal acceleration command value according to the mobile object position in a platoon of each of the mobile objects 21 in platoon travel by the mobile object motion control device 1A, the platoon travel illustrated in FIGS. 10(a) and 10(b) and FIG. 11 can be realized.

In each of the mobile objects 21, the longitudinal acceleration is controlled according to the state of a carried object. For example, in the mobile object 21 in which the occupant grazes forward, the longitudinal acceleration control is performed so that the clearance dn+1 changes more gently as compared with the case of the mobile object 21 in which the occupant does not graze forward (refer to FIG. 7(*b*)). Therefore, the following mobile object 21_*n* slowly approaches the preceding mobile object 21_*n*−1, and the occupant of the following mobile object 21_*n* can be prevented from feeling anxiety or oppression due to rapid approach of the preceding mobile object 21_*n*−1. When an object carried by a mobile object is a handle-with-care item which requires careful handling such as precision machines and perishable food, carriage in which an impact to the carried object is suppressed can be realized.

Figure 27:
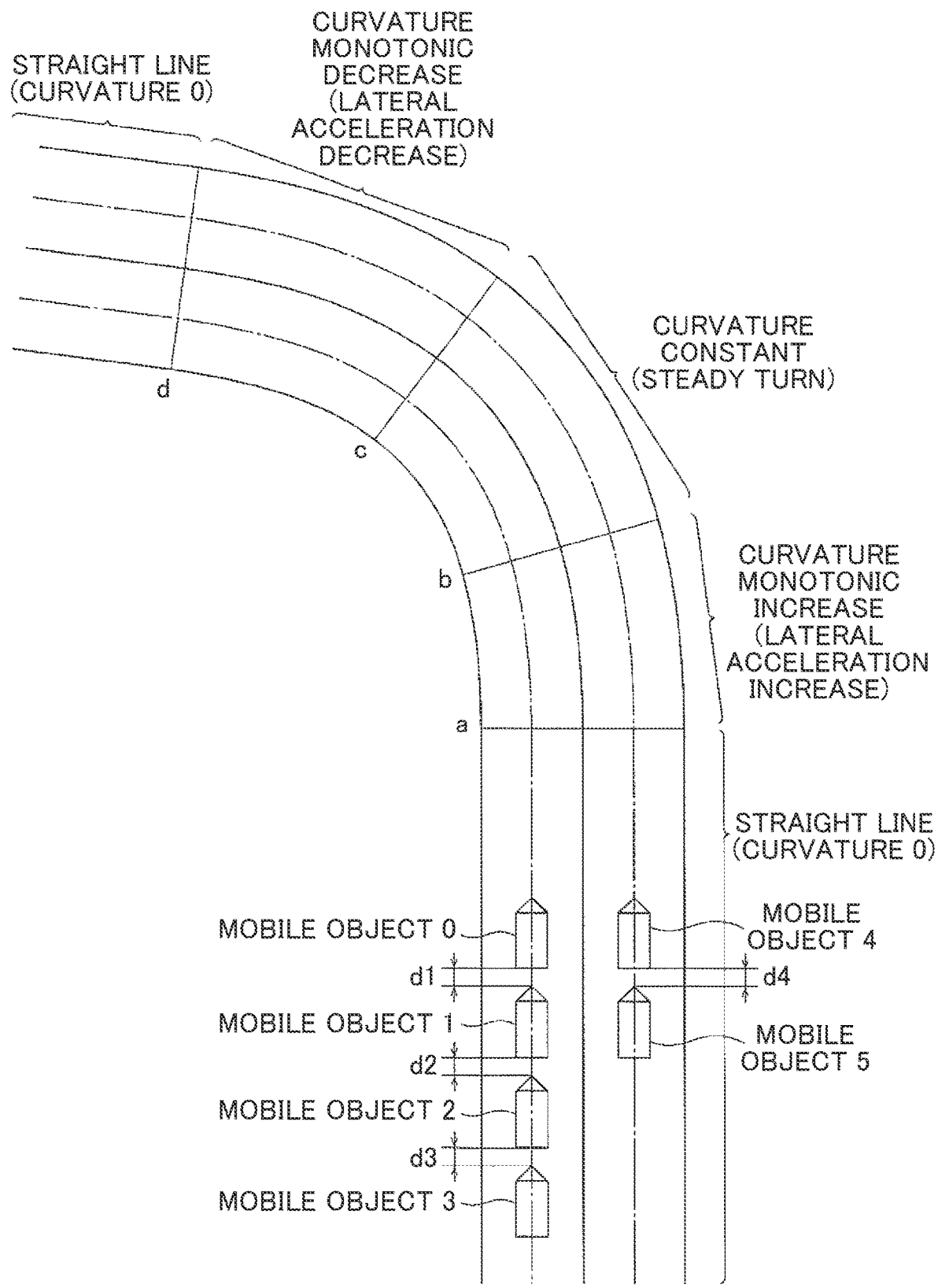
FIG. 27 is a diagram illustrating a modification of the embodiment.

FIG. 27 is a diagram illustrating a further another modification of the embodiment. FIG. 27 is a diagram corresponding to FIG. 1 and is different from FIG. 1 with respect to points that the number of travelable lanes is two and the number of mobile objects is six.

Although the case that a plurality of mobile objects 0 to 4 are arranged in a line and travel in a platoon has been described in the foregoing embodiment, for example, for example, in the case of a path in which the mobile objects can travel in two lines in a platoon, a configuration that the mobile objects are divided in two platoons on the basis of the information of carried objects and pass through a curve may be employed. For example, a plurality of mobile objects 0 to 3 on each of which an occupant who does not graze forward rides are allowed to travel by forming a platoon on an inner side in a curve and mobile objects 4 and 5 on which an occupant who grazes forward rides and a handle-with-care item is put may travel in a platoon on an outer side in the curve.

Concretely, (the target path obtaining unit 31 of) the platoon control computing unit 1Aa determines whether or not a path through which each of the mobile objects passes is a path in which a plurality of mobile objects are arranged and can travel in a platoon. When the path is determined as a path in which a plurality of mobile objects are arranged and can travel in a platoon, the path of each of the mobile objects 21 is set on the basis of the information of a carried object of each of the mobile objects 21 and the state of the carried object, obtained by the carried-object information obtaining unit 34 in the platoon control computing unit 1Aa.

For example, in the case where an occupant rides on each of the mobile objects 21, the mobile objects are classified to a mobile object 21 in which the occupant grazes forward or rearward and a mobile object 21 in which the occupant does not graze. When a mobile object 21 in which no occupant rides is included, it is included in the mobile object 21 in which an occupant does not graze. With respect to the mobile object 21 in which the occupant gazes forward or rearward, a path on which the mobile object 21 is made travel on the inner side of a curve is set, and the longitudinal acceleration control which places priority on ride comfort over transport efficiency is performed. On the other hand, with respect to the mobile object in which the occupant does not gaze forward or rearward, a path on which the mobile object is made travel on the outer side of a curve is set, and the longitudinal acceleration control in which both transport efficiency and ride comfort are considered is performed.

For example, in the case where cargo is put on each of the mobile objects 21, whether the cargo is a handle-with-care item or not is classified. With respect to the mobile object 21 on which a handle-with-care item is put, a path for making the mobile object 21 travel on the inner side of a curve is set, and the longitudinal acceleration control placing priority on careful handling over transport efficiency is performed. On the other hand, with respect to the mobile object on which no handle-with-care item is put, a path for making the mobile object 21 travel on the outer side of a curve is set, and the longitudinal acceleration control in which both transport efficiency and careful handling are considered is performed.

For example, in the case where each of the mobile objects 21 is construction machine such as a dump truck capable of conveying earth and sand, the mobile objects 21 are classified depending on whether earth and sand are loaded or not. With respect to the mobile object 21 on which earth and sand are loaded, there is tendency that the braking distance becomes long, the position of gravity center is high, and travel stability becomes low. Consequently, a path in which the mobile object is made travel on the inner side of a curve is set, and the longitudinal acceleration control which places priority on the travel stability over transport efficiency is performed. On the other hand, with respect to the mobile object 21 on which earth and sand are not loaded, there is tendency that the braking distance becomes short, the position of gravity center is low, and travel stability becomes high. Therefore, a path in which the mobile object is made travel on the outer side of a curve is set, and the longitudinal acceleration control which places priority on both transport efficiency and travel stability is performed.

As described above, by classifying a platoon in accordance with the kind or state of a carried object, for example, for a platoon configured by a mobile object on which an occupant who does not gaze forward rides and a mobile object on which cargo that is not influenced by a cargo shifting is put, the longitudinal acceleration control placing priority on transport efficiency is performed. For a platoon configured by a mobile object on which an occupant who gazes forward rides and a mobile object on which cargo requiring handling with care such as precision machine is put, the longitudinal acceleration control placing priority on ride comfort and safety can be performed.

According to the modification, by dividing one platoon into small platoons before a curve and performing the longitudinal acceleration control on the platoon unit basis, the computation amount of the longitudinal acceleration control can be suppressed to be small, the lower cost of the computing device can be achieved, a platoon is prevented from becoming long, and the transport efficiency can be improved.

As described above, in the embodiment, in platoon travel in which a plurality of mobile objects are formed in a platoon and travel so as to keep predetermined clearances, the longitudinal acceleration of at least one of a preceding mobile object and a following mobile object is controlled so as to increase the clearance between a preceding mobile object and a following mobile object before the absolute value of the lateral acceleration of the following mobile object or the curvature of a travel path of the following mobile object increases or decreases, and to decrease the clearance in or after a section in which the absolute value of the lateral acceleration of the preceding mobile object and the following mobile object or the curvature of the travel path of the preceding mobile object and the following mobile object increases or decreases. More specifically, travel information of mobile objects travelling in a platoon is transmitted/received among the mobile objects, the longitudinal acceleration of at least one of the preceding mobile object and the following mobile object is controlled so as to increase the clearance before the absolute value of the lateral acceleration of the following mobile object or the curvature of the travel path of the following mobile object increases or decreases, and the longitudinal acceleration of the preceding mobile object and the following mobile object is controlled to decrease the clearance in and after a section in which the absolute value of the lateral acceleration of the preceding mobile object and the following mobile object or the curvature of the travel path of the preceding mobile object and the following mobile object increases or decreases.

In other words, at the time of execution of the platoon travel tracing a preceding mobile object, in a scene that the head mobile object starts decreasing the speed for a curved road, the longitudinal acceleration of each of the mobile objects is controlled so as to generate negative longitudinal acceleration (decelerate) from a mobile object at the tail end of the platoon or so that the longitudinal acceleration generated becomes smaller (deceleration becomes larger) toward the rear mobile object. The longitudinal acceleration of each of mobile objects is controlled so that the minimum value of the longitudinal acceleration (maximum deceleration) generated in a section in which the absolute value of lateral acceleration generated in a mobile object increases or the road curvature in a mobile object travel position or the curvature of a travel path of a mobile object increases becomes smaller (the maximum deceleration becomes larger) toward the mobile object at the head, and the maximum value of the longitudinal acceleration (maximum acceleration) generated in a section in which the absolute value of the lateral acceleration generated in a mobile object decreases or the road curvature in a mobile object travel position or the curvature of a travel path of a mobile object decreases becomes larger (the maximum acceleration becomes larger) toward the mobile object at the tail end.

In such a manner, for example, the relation between longitudinal acceleration and lateral acceleration generated during a period until a group of mobile objects traveling in a platoon in a straight line section enters a steady turn state can be controlled so as to change suitably to all of the mobile objects in the platoon, and an effect that the comfortableness of occupants of the mobile objects improves can be expected.

Although the embodiments of the present invention have been specifically described above, the present invention is not limited to the foregoing embodiments, and various design changes can be made within the spirits of the present invention described in the scope of the claims for a patent. For example, since the embodiments have been described in detail for explaining the present invention so as to be easily understood, the present invention is not always limited to the system having all of the components described. A part of the components of any of the embodiments can be replaced with the components of another embodiment, and the components of any of the embodiments can be added to the components of another embodiment. Further, with respect to a part of the components of each of the embodiments, another component can be added, deleted, or replaced.

LIST OF REFERENCE SIGNS

1: mobile object control system, 1A: mobile object motion control device, 1Aa: platoon control computing unit, 1Ab: travel control computing unit, 21: mobile object, 21_n: mobile objects in a mobile object group which travels in platoon (n: positive integer), 31: target path obtaining unit, 32: mobile object motion state obtaining unit, 33: platoon information obtaining unit, 34: carried-object information obtaining unit, 35: allowable value calculating unit, 36: control command transmitting unit, 37: control plan transmitting unit, 38: mobile object motion control computing unit

The invention claimed is:

1. A mobile object control system that makes a plurality of mobile objects travel in a platoon along a travel path which is preliminarily set, comprising:
   a computer, programmed to:
   compute a longitudinal acceleration in a travel path of a preceding mobile object and a following mobile object, and
   adjust a gain of an arithmetic expression for computing the longitudinal acceleration,
   wherein the platoon includes the preceding mobile object and the following mobile object that follows the preceding mobile object along the travel path,
   wherein the gain of the following mobile object is adjusted based on a size of the preceding mobile object relative to a size of the following mobile object, a difference between accelerations of the preceding mobile object and the following mobile object, and based on a line of sight of an occupant of either the following mobile object or the preceding mobile object, and
   wherein a control of decelerating the following mobile object is performed, based on the adjusted gain, before a time when an absolute value of lateral acceleration of the preceding mobile object or a curvature of the travel path of the preceding mobile object starts increasing.

2. The mobile object control system according to claim 1, wherein the computer is programmed to:
   when the line of sight of the occupant of the following mobile object is forward toward the preceding mobile object, adjust the gain by setting the gain of the following mobile object in a section in which curvature of a travel path of the following mobile object increases, to be larger than that in a case where the line of sight of the occupant is not forward towards the preceding mobile object.

3. The mobile object control system according to claim 1, wherein the computer is programmed to:
   when the line of sight of the occupant of the following mobile object is forward toward the preceding mobile object, adjust the gain by setting the gain of the following mobile object in a section in which curvature of a travel path of the following mobile object decreases, to be smaller than that in a case where the line of sight of the occupant is not forward towards the preceding mobile object.

4. The mobile object control system according to claim 1, wherein the computer is programmed to:
   when the line of sight of the occupant of the preceding mobile object is rearward toward the following mobile object, adjust the gain by setting the gain of the preceding mobile object in a section in which curvature of a travel path of the preceding mobile object increases, to be larger than that in a case where the line of sight of the occupant is not rearward toward the following mobile object.

5. The mobile object control system according to claim 1, wherein the computer is configured to:
   when the line of sight of the occupant of the preceding mobile object is rearward toward the following mobile object, adjust the gain by setting the gain of the preceding mobile object in a section in which curvature of a travel path of the preceding mobile object decreases, to be smaller than that in a case where the line of sight of the occupant is not rearward toward the following mobile object.

6. The mobile object control system according to claim 1, wherein the computer is programmed to:
when the line of sight of the occupant of the following mobile object is forward toward the preceding mobile object, compute the longitudinal acceleration of the following mobile object so that the difference from the longitudinal acceleration of the preceding mobile object becomes smaller in a section in which curvature of a travel path of the following mobile object increases, as compared with a case where the line of sight of the occupant is not forward toward the preceding mobile object.

7. The mobile object control system according to claim 1, wherein the computer is programmed to:
when the line of sight of the occupant of the following mobile object is forward toward the preceding mobile object, compute the longitudinal acceleration of the preceding mobile object so that the difference from the longitudinal acceleration of the following mobile object becomes smaller in a section in which curvature of a travel path of the preceding mobile object decreases, as compared with a case where the line of sight of the occupant is not forward toward the preceding mobile object.

8. The mobile object control system according to claim 1, wherein the computer is programmed to adjust a deceleration time of the following mobile object based on the line of sight of the occupant of the following mobile object.

9. The mobile object control system according to claim 8, wherein the computer is programmed to:
when the line of sight of the occupant of the following mobile object is forward toward the preceding mobile object, set the deceleration time of the following mobile object to be longer than the deceleration time in a case where the line of sight of the occupant is not forward towards the preceding mobile object.

* * * * *